(12) United States Patent
Takeda et al.

(10) Patent No.: US 10,215,899 B2
(45) Date of Patent: Feb. 26, 2019

(54) PHASE DIFFERENCE FILM, POLARIZATION PLATE, AND LIQUID CRYSTAL DISPLAY DEVICE

(71) Applicant: FUJIFILM Corporation, Tokyo (JP)

(72) Inventors: Jun Takeda, Kanagawa (JP); Shunya Katoh, Kanagawa (JP); Michio Nagai, Kanagawa (JP); Yoji Ito, Kanagawa (JP); Masaya Suzuki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 201 days.

(21) Appl. No.: 14/995,671

(22) Filed: Jan. 14, 2016

(65) Prior Publication Data

US 2016/0131809 A1 May 12, 2016

Related U.S. Application Data

(63) Continuation of application No. PCT/JP2014/068858, filed on Jul. 16, 2014.

(30) Foreign Application Priority Data

Jul. 18, 2013 (JP) .................................. 2013-149622
May 26, 2014 (JP) .................................. 2014-107922

(51) Int. Cl.
*G02F 1/1335* (2006.01)
*G02B 5/30* (2006.01)
(Continued)

(52) U.S. Cl.
CPC ......... *G02B 5/3016* (2013.01); *G02F 1/1337* (2013.01); *G02F 1/13363* (2013.01);
(Continued)

(58) Field of Classification Search
CPC . G02B 5/3016; G02F 1/1337; G02F 1/13363; G02F 1/134363; G02F 2001/133742
See application file for complete search history.

(56) References Cited

U.S. PATENT DOCUMENTS 4,232,949 A * 11/1980 Huffman .................. C09B 1/00
 252/299.1
7,602,462 B2 10/2009 Koishi et al.
(Continued)

FOREIGN PATENT DOCUMENTS

CN 1954244 A 4/2007
CN 101235220 A 8/2008
(Continued)

OTHER PUBLICATIONS

International Preliminary Report on Patentability issued by WIPO dated Jan. 28, 2016, in connection with International Patent Application No. PCT/JP2014/068858.
(Continued)

*Primary Examiner* — Hoan C Nguyen
(74) *Attorney, Agent, or Firm* — Edwards Neils LLC; Jean C. Edwards, Esq.

(57) ABSTRACT

A liquid crystal (LC) display device uses a phase difference film which increases front contrast of the device, and a polarization plate. The film includes a first optical anisotropic layer, and a second optical anisotropic layer thereon, the first layer formed by fixing an LC compound in a homogeneous alignment state, has an order parameter (OP) of 0.75 to 0.95, and layer thickness of 0.3 μm to 3.0 μm, the second layer formed by fixing an LC compound in a homeotropic alignment state, has an OP of 0.60 to 0.95, and layer thickness of 0.3 μm to 3.0 μm, the OP which is denoted by $OP=(A_\parallel - A\perp)/(2A\perp + A_\parallel)$, "$A_\parallel$" which represents absorbance of the LC compound regarding light polarized parallel to an alignment direction, and "$A\perp$" which represents absorbance of the LC compound regarding light polarized vertical to the alignment direction.

20 Claims, 2 Drawing Sheets

(51) Int. Cl.
*G02F 1/13363* (2006.01)
*G02F 1/1337* (2006.01)
*G02F 1/1343* (2006.01)

(52) U.S. Cl.
CPC .. *G02F 1/133634* (2013.01); *G02F 1/134363* (2013.01); *G02F 2001/133633* (2013.01); *G02F 2001/133738* (2013.01); *G02F 2001/133742* (2013.01)

(56) References Cited

U.S. PATENT DOCUMENTS

| | | | |
|---|---|---|---|
| 8,902,398 B2 | 12/2014 | Sakai | |
| 2006/0177607 A1* | 8/2006 | Ohmori | C08J 5/18 428/1.31 |
| 2007/0024970 A1* | 2/2007 | Lub | C09K 19/3852 359/487.02 |
| 2007/0200987 A1* | 8/2007 | Yoda | G02B 5/3016 349/119 |
| 2007/0211199 A1* | 9/2007 | Kobayashi | G02F 1/133528 349/117 |
| 2008/0284948 A1* | 11/2008 | Koishi | G02B 5/3083 349/96 |
| 2009/0033835 A1 | 2/2009 | Fukagawa et al. | |
| 2009/0033861 A1 | 2/2009 | Shiga et al. | |
| 2009/0046224 A1* | 2/2009 | Iida | G02F 1/133634 349/96 |
| 2009/0207349 A1* | 8/2009 | Yoshimi | G02B 5/201 349/107 |
| 2010/0309414 A1 | 12/2010 | Tomonaga et al. | |
| 2012/0314159 A1 | 12/2012 | Sakai | |
| 2013/0114027 A1* | 5/2013 | Hasegawa | G02B 5/305 349/96 |

FOREIGN PATENT DOCUMENTS

| | | |
|---|---|---|
| CN | 101849207 A | 9/2010 |
| JP | H11148080 A | 6/1999 |
| JP | 2000298210 A * | 10/2000 |
| JP | 2001255413 A * | 9/2001 |
| JP | 2002296424 A | 10/2002 |
| JP | 2006215221 A | 8/2006 |
| JP | 2006-268018 A | 10/2006 |
| JP | 2009-086260 | 4/2009 |
| JP | 2012-255926 A | 12/2012 |
| JP | 2013047758 A | 3/2013 |
| TW | 200639451 A | 11/2006 |
| TW | 201224125 A | 6/2012 |

OTHER PUBLICATIONS

Notification of Reasons for Refusal issued by the Japanese Patent Office dated Nov. 15, 2016 in connection with Japanese Patent Application No. 2014-107922.
International Search Report issued in connection with International Patent Application No. PCT/JP2014/068858 dated Sep. 30, 2014.
Written Opinion issued in connection with International Patent Application No. PCT/JP2014/068858 dated Sep. 30, 2014.
First Office Action issued by the Chinese Intellectual Property Office dated Mar. 1, 2017 in connection with Chinese Patent Application No. 201480040253.X.
Notification of Reasons for Refusal issued by the Japanese Patent Office dated Jul. 4, 2017 in connection with Japanese Patent Application No. 2014-107922.
Notification of Reason for Refusal issued by the Korean Intellectual Property Office dated Jan. 19, 2017 in connection with Korean Patent Application No. 10-2016-7000907.
Office Action issued by the Japanese Patent Office dated Sep. 11, 2018, in connection with corresponding Japanese Patent Application No. 2017-194251.
Office Action issued by the Taiwanese Patent Office dated Jul. 23, 2018, in connection with corresponding Taiwanese Patent Application No. 103123549.
Office Action issued by the Taiwanese Patent Office dated Apr. 30, 2018, in connection with Taiwanese Patent Application No. 103123549.

* cited by examiner

PHASE DIFFERENCE FILM, POLARIZATION PLATE, AND LIQUID CRYSTAL DISPLAY DEVICE

CROSS-REFERENCE TO RELATED APPLICATIONS

This application is a Continuation of PCT International Application No. PCT/JP2014/068858 filed on Jul. 16, 2014, which was published under PCT Article 21(2) in Japanese, and claims priority under 35 U.S.C § 119(a) to Japanese Patent Application No. 2013-149622 filed on Jul. 18, 2013 and Japanese Patent Application No. 2014-107922 filed on May 26, 2014. The of the above applications are hereby expressly incorporated by reference, in their entirety, into the present application.

BACKGROUND OF THE INVENTION

1. Field of the Invention

The present invention relates to a phase difference film. In addition, the present invention relates to a polarization plate and a liquid crystal display device using the phase difference film.

2. Description of the Related Art

Recently, a tablet or a mobile phone using a liquid crystal display device in an In-Place-Switching (IPS) mode has been widely used. For example, it has been considered that an optical anisotropic layer using alignment of a liquid crystal compound is used as an optical film used in the tablet or the mobile phone. Specifically, a phase difference film is disclosed in which the optical anisotropic layer is disposed on one surface of a transparent substrate and a phase difference layer is disposed on the other surface (FIG. 1 of the like of JP2009-86260A).

In addition, according to a demand for thinning the tablet or the mobile phone, a demand for thinning the phase difference film used in the liquid crystal display device in the IPS mode has also increased. JP2012-255926A has been known as a technology for thinning the phase difference film. Specifically, in JP2012-255926A, a phase difference film is disclosed in which a positive C plate, and a positive A plate or an optically biaxial plate are laminated by directly adhering to each other without using an adhesive agent.

SUMMARY OF THE INVENTION

Here, in JP2009-86260A, a method of forming the phase difference layer on the surface of the optical anisotropic layer is not specifically disclosed. From a viewpoint of thinning, it is required that the phase difference layer is able to be suitably formed on the surface of the optical anisotropic layer. Further, the present inventors have performed an additional test with respect to Example 1 specifically disclosed in JP2009-86260A, and have found that sufficient front contrast is not necessarily obtained.

In addition, the present inventors have performed an additional test with respect to Example 1 in JP2012-255926A, and have confirmed that compensation of the polarization plate (a light leakage at a view angle) tends to be reduced compared to a form in which the phase difference film is not included. However, currently, it has been found that front contrast considerably deteriorates in a commercially available phase difference film having a thickness of approximately 100 μm.

In order to solve the problems described above, an object of the present invention is to provide a phase difference film which is able to increase front contrast of the liquid crystal display device. In addition, another object of the present invention is to provide a polarization plate and a liquid crystal display device using the phase difference film.

As a result of intensive studies of the present inventors based on the problems described above, it has been found that, in a phase difference film including at least two adjacent optical anisotropic layers, an alignment state before fixing each of the optical anisotropic layers, an order parameter, and a film thickness are set in a predetermined range, and thus the problems described above are able to be solved. Specifically, the problems described above are solved by the following means <1>, and preferably by the following means <2> to <17>.

<1> A phase difference film including a first optical anisotropic layer; and a second optical anisotropic layer on a surface of the first optical anisotropic layer, in which the first optical anisotropic layer is formed by fixing a liquid crystal compound in a homogeneous alignment state, has an order parameter of 0.75 to 0.95, and has a layer thickness of 0.3 μm to 3.0 μm, the second optical anisotropic layer is formed by fixing a liquid crystal compound in a homeotropic alignment state, has an order parameter of 0.60 to 0.95, and has a layer thickness of 0.3 μm to 3.0 μm, and the order parameter OP is denoted by OP=$(A_{\parallel}-A\perp)/(2A\perp+A_{\parallel})$, "$A_{\parallel}$" represents absorbance of the liquid crystal compound with respect to light polarized parallel to an alignment direction, and "$A\perp$" represents absorbance of the liquid crystal compound with respect to light polarized vertical to the alignment direction.

<2> The phase difference film according to <1>, in which the first optical anisotropic layer is a layer formed by fixing the liquid crystal compound in a smectic phase state.

<3> The phase difference film according to <1> or <2>, in which the second optical anisotropic layer is a layer formed by fixing the liquid crystal compound in a nematic phase state.

<4> The phase difference film according to any one of <1> to <3>, in which the first optical anisotropic layer satisfies Expressions (1) and (2) described below.

$$100 \text{ nm} \leq Re(550) \leq 200 \text{ nm} \qquad \text{Expression (1)}$$

$$0.8 \leq Nz \leq 1.2 \qquad \text{Expression (2)}$$

In Expression (1), Re(550) represents in-plane retardation at a wavelength of 550 nm.

In Expression (2), Nz represents (nx−nz)/(nx−ny), nx represents a refractive index in a slow axis direction in a plane, ny represents a refractive index in a direction orthogonal to nx in the plane, and nz represents a refractive index in a direction orthogonal to nx and ny.

<5> The phase difference film according to any one of <1> to <4>, in which the first optical anisotropic layer satisfies Expression (3) described below.

$$Re(450)/Re(650)<1 \qquad \text{Expression (3)}$$

In Expression (3), Re(450) and Re(650) each represent in-plane retardation at a wavelength of 450 nm and 650 nm.

<6> The phase difference film according to any one of <1> to <5>, in which the first optical anisotropic layer includes a leveling agent.

<7> The phase difference film according to any one of <1> to <6>, in which the second optical anisotropic layer includes a vertical aligning agent.

<8> The phase difference film according to any one of <1> to <7>, in which a thickness of the phase difference film is 0.6 μm to 6 μm.

<9> The phase difference film according to any one of <1> to <8>, in which each of the first optical anisotropic layer and the second optical anisotropic layer includes a rod-like liquid crystal compound.

<10> The phase difference film according to any one of <1> to <9>, in which the phase difference film includes an alignment film, the first optical anisotropic layer, and the second optical anisotropic layer on a supporter in this order.

<11> A polarization plate including a polarizing film; and the phase difference film according to any one of <1> to <10>.

<12> The polarization plate according to <11>, in which a first optical anisotropic layer is disposed on a surface of the polarizing film.

<13> A liquid crystal display device including the phase difference film according to any one of <1> to <10%; or the polarization plate according to <11% or <12>.

<14% The liquid crystal display device according to <13>, in which the liquid crystal display device is in an IPS mode.

<15> The liquid crystal display device according to <13> or <14>, in which the polarization plate according to <11> or <12> is disposed on a front side of the liquid crystal display device.

<16> The liquid crystal display device according to <15>, in which an optical film in which in-plane retardation Re(550) at a wavelength of 550 ran is 30 nm to 120 nm, and retardation Rth(550) in a thickness direction at a wavelength of 550 nm is 20 nm to 100 nm is disposed between a polarizing film on a rear side of the liquid crystal display device and a liquid crystal cell.

<17> The liquid crystal display device according to <16>, in which the optical film disposed on the rear side of the liquid crystal display device includes an optical anisotropic layer in which a liquid crystal compound is tilt-aligned.

According to the present invention, it is possible to provide a phase difference film which is able to increase front contrast of a liquid crystal display device. In addition, it is possible to provide a polarization plate and a liquid crystal display device using the phase difference film.

DESCRIPTION OF THE PREFERRED EMBODIMENTS

Figure 1:
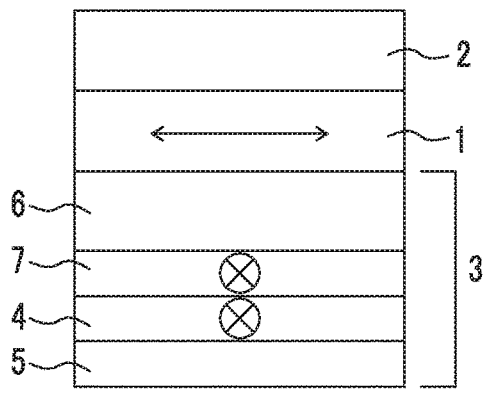
FIG. 1 is a schematic view illustrating ample of a configuration of a phase difference film of the present invention.

Hereinafter, the present invention will be described in detail. Furthermore, herein, numerical values before and after "to" are used for indicating the lower limit value and the upper limit value. Furthermore, herein, a numerical range or a numerical value is able to be interpreted as a numerical range and a numerical value including an error which is allowable in the technical field belonging to the present invention.

Herein, a relationship of an optical axis includes an error which is allowable in the technical field belonging to the present invention. Herein, "parallel", "orthogonal", and "vertical" indicate a range of less than or equal to an exact angle ±5°. An error with respect to the exact angle is preferably in a range of less than ±4°, and is more preferably in a range less than ±3°.

A phase difference film of the present invention includes a first optical anisotropic layer; and a second optical anisotropic layer on a surface of the first optical anisotropic layer, the first optical anisotropic layer is formed by fixing a liquid crystal compound in a homogeneous alignment state, has an order parameter of 0.75 to 0.95, and has a layer thickness of 0.3 μm to 3.0 μm, and the second optical anisotropic layer is formed by fixing a liquid crystal compound in a homeotropic alignment state, and has an order parameter of 0.60 to 0.95.

According to such a configuration, it is possible to make the thickness of the phase difference an thin, and it is possible to attain high front contrast at the time of being incorporated in a liquid crystal display device. A configuration in which the second optical anisotropic layer is disposed on the surface of the first optical anisotropic layer is also disclosed in JP2012-255926A described above. However, the present inventors have performed examination with respect to the configuration described above, and have found that, in the phase difference film disclosed in Example 1 of JP2012-255926A, front contrast is not necessarily sufficient. According to further examination of the reason, it has been found that disorder occurs in the alignment of the positive C plate. That is, it has been known that alignment properties of the liquid crystal compound are easily affected by a lower substrate, and thus a layer formed by directly applying a coating liquid including the liquid crystal compound onto the surface of the positive A plate using a known technology as disclosed in JP2012-255926A is affected by the positive A plate which is the lower substrate. As a result thereof, disorder occurs in the alignment of the liquid crystal compound in a boundary portion between the positive A plate and the layer formed by directly applying the coating liquid including the liquid crystal compound onto the surface of the positive A plate, and thus an optical anisotropic layer (the positive C plate) disposed on the surface of the positive A plate is not able to attain a predetermined order parameter. Further, it is possible to assume that the positive A plate exhibits nematicity, and thus the liquid crystal compound specifically disclosed in JP2012-255926A has an originally low order parameter (around 0.7) and has lower front contrast.

In the present invention, not only in the first optical anisotropic layer, but also in the second optical anisotropic layer on the surface of the first optical anisotropic layer, the liquid crystal compound is aligned with high alignment order, and thus the problem is solved. That is, the second optical anisotropic layer in which the liquid crystal compound is fixed by homeotropic alignment is formed on the surface of the first optical anisotropic layer in which the liquid crystal compound is homogeneously aligned with high order, and thus high front contrast at the time of being incorporated in a liquid crystal display device is attained. Further, according to the configuration of the present invention, it is also possible to improve display tint and vertical symmetry of the liquid crystal display device.

Here, in the present invention, the degree of alignment order of the liquid crystal compound forming the first optical anisotropic layer and the second optical anisotropic layer is set as an order parameter. Here, the order parameter will be described. In order to generate optical anisotropy, it is necessary to align an optical element. Here, the optical element is an optical element generating anisotropy of a refractive index, and for example, includes disk-like liquid crystal molecules or rod-like liquid crystal molecules which exhibit a liquid crystal phase in a predetermined temperature range, and a polymer which is aligned by a stretching treatment or the like. Bulk birefringence of an optical material is determined according to an intrinsic birefringence index of one optical element and the statistical degree of alignment of the optical element. For example, the size of optical anisotropy of the optical anisotropic layer configured of the liquid crystal compound is determined by the intrinsic birefringence index of the liquid crystal compound which is a main optical element generating optical anisotropy and the statistical degree of alignment of the liquid crystal compound. An order parameter S has been known as a parameter indicating the degree of alignment. An alignment order parameter is 1 when there is no distribution as in a crystal state, and the alignment order parameter is 0 when there is completely random distribution as in a liquid state. For example, a nematic liquid crystal generally has a value of approximately 0.6. The order parameter S, for example, is disclosed in detail in "Physical Properties of Liquid Crystal" written by DE JEU, W. H. (Kyoritsu Shuppan Co., Ltd., 1991, Page 11), and is denoted by the following expression.

$$S = \frac{1}{2}<3\cos^2\theta - 1>$$

θ is an angle between an average alignment axis direction of an alignment lenient and an axis of each of the alignment elements.

A polarization Raman method, an IR method, an X-ray method, a fluorescence method, a sonic speed method, and the like are known as means for measuring the order parameter.

The order parameter is able to be comparatively easily obtained by the following expression when the optical anisotropic layer has dichromatic properties.

$$OP=(A_{\parallel}-A\perp)/(2A\perp+A_{\parallel})$$

"$A_{\parallel}$" represents absorbance of the liquid crystal compound with respect to light polarized parallel to an alignment direction.

"$A\perp$" represents absorbance of the liquid crystal compound with respect to light polarized vertical to the alignment direction.

The fact that the order parameter is one of indices indicating the degree of alignment order of the liquid crystal compound is known as disclosed in Page 5 of "Development Technology of Liquid Crystal Polymer-High Performance and High Function" (CMC Publishing Co., Ltd.), JP2008-297210A, or the like.

The liquid crystal compound is regularly arranged as the value of the order parameter becomes closer to 1. That is, as the order parameter becomes closer to 1, the liquid crystal compound has crystallinity. Substantially, the highest value of the order parameter exhibiting liquid crystallinity is approximately 0.95. Accordingly, the upper limit value of the order parameter of the first optical anisotropic layer and the second optical anisotropic layer of the present invention is set to 0.95.

Furthermore, the absorbance is able to be obtained by "Absorbance=1−Permeability".

In addition, a specific measurement method of the order parameter in the present invention is as follows.

The liquid crystal compound to which a dichromatic dye is added is aligned on a rubbing alignment film such that a liquid crystal thin film is formed and is dried, and the film is cured through an ultraviolet curing process. In this liquid crystal hard film, each spectrum (absorbance) of a case where a polarization direction of an incidence ray of a spectrophotometer is vertically fixed and an alignment direction of the liquid crystal thin film is vertically fixed and a case where a polarization direction of an incidence ray of a spectrophotometer is vertically fixed and an alignment direction of the liquid crystal thin film is horizontally fixed is measured, polarization absorption spectrum (absorbance) of quartz glass which is separately measured is subtracted from each of the spectrums described above, and thus $A\perp$ and $A_{\parallel}$ are set. This is calculated from the expression of the order parameter described above.

In addition, it has been found that the order parameter has a strong mutual relationship with respect to a depolarization degree in a front direction and an oblique direction at the time of arranging the phase difference film between two polarization plates which are crossed nicol-arranged.

The depolarization degree has a close relationship with respect to contrast at the time of being mounted on a liquid crystal display, and suppressing the depolarization degree is preferable in the market. The depolarization degree is changed not only by scattering performance of the film but also by a slow axis and a polarization axis of the film. When an order parameter of a liquid crystal decreases, liquid crystal molecules generate a fine alignment fluctuation, and light scattering occurs due to the alignment fluctuation, and thus the depolarization degree is likely to decease. Here, the depolarization degree is preferably less than or equal to 0.000080, is more preferably less than or equal to 0.000025, is even more preferably less than or equal to 0.000024, and is still more preferably less than or equal to 0.000022. According to such a depolarization degree, the effect of the present invention is more effectively expressed. A depolarization degree D is denoted by D=Lmin/Lmax−$L_0$min/$L_0$max.

Lmin represents the minimum luminance of the phase difference film arranged between two polarization plates in a crossed nicol state.

Lmax represents the maximum luminance of the phase difference film arranged between the two polarization plates in a parallel nicol state.

$L_0$min represents the minimum luminance of the two polarization plates in the crossed nicol state.

$L_0$max represents the maximum luminance of the two polarization plates in the parallel nicol state.

The present inventors has examined the reason for a change in the front contrast of the film using the liquid crystal compound having a high order parameter, and have found that the depolarization degree of the phase difference film is related to the reason. That is, it has found that when the depolarization degree decreases, the front contrast is enhanced. As a result of more detailed examination, it has found that the degree of alignment order (the order parameter) tends to decrease due to the alignment fluctuation of the liquid crystal in the phase difference film, and light scattering tends to easily occur. It has been found that, by enhancing the order parameter, the depolarization degree is enhanced, and the front contrast at the time of incorporating the phase difference film of the present invention in a liquid crystal display device is remarkably enhanced.

In a method of improving the depolarization degree in the oblique direction of the phase difference film of the present invention, for example, the depolarization degree is able to be improved, as described above, by selecting a specific liquid crystal compound, and by containing two or more types of liquid crystal compounds at a predetermined mixed ratio, by containing a predetermined additive, by optimizing the temperature of ultraviolet irradiation in which aligning and curing are performed, or by optimizing the temperature at which the aligning and the curing are performed at the time of forming the optical anisotropic layer. As a result thereof, a decrease in contrast (CR) which is caused by the light scattering of the liquid crystal due to the alignment fluctuation is able to be reduced.

Figure 5:
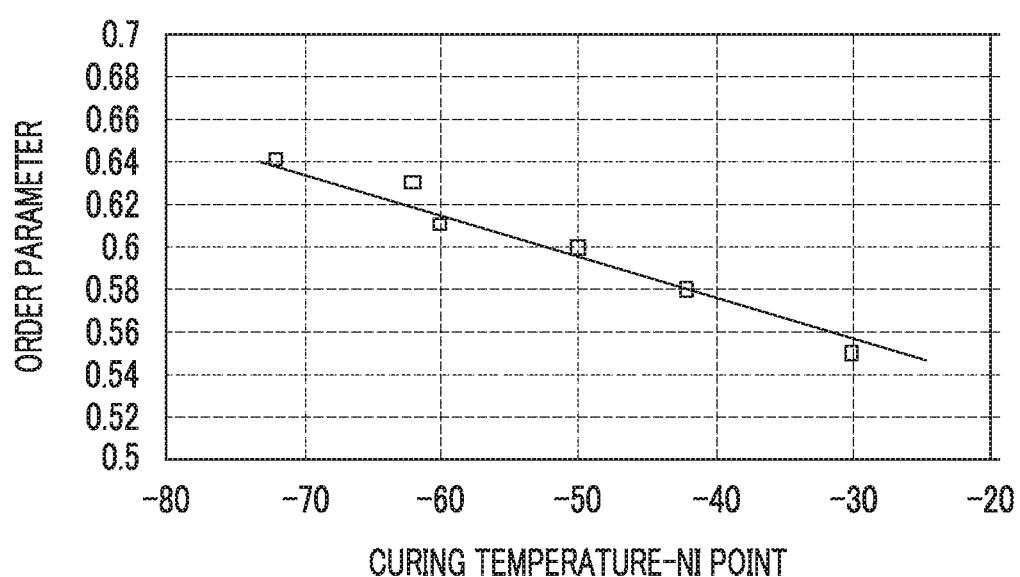
FIG. 5 is a graph illustrating an example of a relationship bet en an order parameter, and an NI point and a curing temperature.

In addition, as a result of examination of the present inventors, as in an example of a C-plate illustrated in FIG. 5, it has been found that the order parameter tends to increase as an NI point (a Nematic—Isotropic transition temperature of the liquid crystal compound becomes higher.

In addition, it has been found that, when a mutual relationship with respect to the temperature at which the aligning and the curing are performed is similarly obtained by using liquid crystal compounds having the same NI point, the order parameter tends to increase as the temperature at which the aligning and the curing are performed becomes lower.

In general, haze of the phase difference film is considered as the physical properties affecting the front contrast of the liquid crystal display device. The haze is indicated by a ratio of the total transmission light of the phase difference film to the total light amount of a scattering light source. As a result of examination of the present inventors, as shown in Table 1 described below, in the haze, it is not possible to sufficiently detect a difference in the front contrast, and in an actual liquid crystal display device, light polarized from the scattering light source through the polarization plate is incident on the phase difference film, and thus an actual measurement system may have a different measurement result. The depolarization degree of the present invention is a measurement system on which actually polarized light is incident, and thus has a mutual relationship with respect to the front contrast of the liquid crystal display device, and enhancement in the measurement system also considerably contributes to the present invention.

Hereinafter, an example of a measurement result of the depolarization degree of samples in which the NI point of the liquid crystal compound and an ultraviolet curing temperature are variously changed are shown.

TABLE 1

| | Depolarization Degree | NI Temperature | Alignment Curing Temperature | Haze |
|---|---|---|---|---|
| Sample 1 | 0.000013 | 105° C. | 40° C. | 0.50 |
| Sample 2 | 0.000027 | 95° C. | 80° C. | 0.40 |
| Sample 3 | 0.000025 | 95° C. | 90° C. | 0.31 |

Hereinafter, the first optical anisotropic layer and the second optical anisotropic layer will be described in detail.

<First Optical Anisotropic Layer>

The first optical anisotropic layer of the present invention is formed by fixing the liquid crystal compound in the homogeneous alignment state, has an order parameter of 0.75 to 0.95, and has a layer thickness of 0.3 µm to 3.0 µm. The order parameter of the first optical anisotropic layer is preferably 0.80 to 0.90, and is more preferably 0.84 to 0.90, from a viewpoint of manufacturing aptitude. It is preferable that a layer satisfying such an order parameter is a layer formed by fixing the liquid crystal compound in a smectic phase state. A manufacturing method of the first optical anisotropic layer will be described below in detail.

The layer thickness of the first optical anisotropic layer used in the present invention is 0.3 µm to 3.0 µm. When the thickness of the first optical anisotropic layer, for example, is less than 0.3 µm or greater than 3.0 µm, the front contrast at the time of being incorporated in the liquid crystal display device deteriorates from a viewpoint of controlling the retardation of the formed first optical anisotropic layer. The film thickness of the first optical anisotropic layer of the present invention is preferably greater than or equal to 0.5 µm, is more preferably greater than or equal to 0.7 µm, and is even more preferably greater than or equal to 0.9 µm, and is preferably less than or equal to 2.8 µm, is more preferably less than or equal to 2.5 µm, is even more preferably less than or equal to 2.0 µm, is still more preferably less than or equal to 1.5 µm, and is particularly preferably less than or equal to 1.3 µm.

In addition, the retardation of the first optical anisotropic layer used in the present invention preferably satisfies 80 nm≤Re(550)≤230 nm, more preferably satisfies 90 nm≤Re(550)≤220 nm, even more preferably satisfies 100 nm≤Re(550)≤200 nm, and particularly preferably satisfies 105 nm≤Re(550)≤130 nm. Here, Re(550) indicates in-plane retardation at a wavelength of 550 nm.

In addition, the first optical anisotropic layer preferably satisfies 90 nm≤Rth(550)≤150 nm, and more preferably satisfies 95 nm≤Rth(550)≤130 nm Here, Rth(550) indicates retardation in a thickness direction at a wavelength of 550 nm.

Further, it is preferable that the first optical anisotropic layer of the present invention satisfies Expression (2) described below.

$$0.8 \leq Nz \leq 1.2 \qquad \text{Expression (2)}$$

In Expression (2), Nz represents (nx−nz)/(nx−ny), nx represents a refractive index in a slow axis direction in a plane, ny represents a refractive index in a direction orthogonal to nx in the plane, and nz represents a refractive index in a direction orthogonal to nx and ny.

It is more preferable that Nz satisfies 0.9≤Nz≤1.1.

It is preferable that the first optical anisotropic layer satisfies 100 nm≤Re(550)≤200 nm and Expression (2).

According to such a range, the effect of the present invention is more effectively expressed at the time of being incorporated in a liquid crystal display device in an IPS mode.

Further, it is preferable that the first optical anisotropic layer exhibits reverse wavelength dispersion properties, and it is more preferable that the first optical anisotropic layer satisfies Expression (3) described below. According to such a configuration, it is possible to further improve tint at the time of incorporating the phase difference film of the present invention in the liquid crystal display device.

$$Re(450)/Re(650) < 1 \qquad \text{Expression (3)}$$

(In Expression (3), each of Re(450) and Re(650) represent in-plane retardation at a wavelength of 450 nm or 650 nm.)

<Second Optical Anisotropic Layer>

The second optical anisotropic layer of the present invention is formed by fixing the liquid crystal compound in the homeotropic alignment state, has an order parameter of 0.60 to 0.95, and has a layer thickness of 0.3 μm to 3.0 μm. When the thickness of the second optical anisotropic layer is less than 0.3 μm or greater than 3.0 μm, the front contrast at the time of being incorporated in the liquid crystal display device deteriorates. The order parameter of the second optical anisotropic layer is preferably 0.65 to 0.80, and is more preferably 0.65 to 0.75. It is preferable that a layer satisfying such an order parameter is a layer formed by fixing the liquid crystal compound in the smectic phase state or in a nematic phase state, and the alignment direction is parallel to a light transmission direction, and thus it is more preferable that a layer formed by fixing the liquid crystal compound in the nematic phase state having a high degree of alignment order is selected from a viewpoint of manufacturing aptitude. In the present invention, the second optical anisotropic layer which is the layer formed by fixing the liquid crystal compound in the smectic phase state or in the nematic phase state having high alignment order is able to be directly formed on the surface of the first optical anisotropic layer, and thus it is possible to attain high front contrast while performing thinning.

Means for directly forming such a second optical anisotropic layer on the surface of the first optical anisotropic layer will be described below.

The layer thickness of the second optical anisotropic layer of the present invention is 0.3 μm to 3.0 μm. In the present invention, even when the second optical anisotropic layer is thinned as described above, desired optical properties are able to be expressed, and thus the second optical anisotropic layer having such a thickness is useful from a viewpoint of thinning. The film thickness of the second optical anisotropic layer of the present invention is preferably greater than or equal to 0.5 μm, is more preferably greater than or equal to 0.7 μm, and is even more preferably greater than or equal to 0.9 μm, and is preferably less than or equal to 2.8 μm, is more preferably less than or equal to 2.5 μm, is even more preferably less than or equal to 2.0 μm, is still more preferably less than or equal to 1.5 μm, and is particularly preferably less than or equal to 1.2 μm.

In addition, the second optical anisotropic layer used in the present invention preferably satisfies $Re(550) \leq 5$ nm, and more invention preferably satisfies $Re(550) \leq 3$ nm. Here, $Re(550)$ indicates in-plane retardation at a wavelength of 550 nm.

In addition, the second optical anisotropic layer preferably satisfies $-300$ nm$\leq Rth(550) \leq 0$ nm, more preferably satisfies $-200$ nm$\leq Rth(550) \leq -60$ nm, and even more preferably satisfies $-450$ nm$\leq Rth(550) \leq -80$ nm. According to such a range, the effect of the present invention is more effectively expressed at the time of being incorporated in a liquid crystal display device in an IPS mode.

<Manufacturing Method of Phase Difference Film>

In general, the phase difference film of the present invention is formed by applying (preferably coating) a composition for forming the second optical anisotropic layer onto the surface of the first optical anisotropic layer, and by curing the composition.

Here, the first optical anisotropic layer is able to be formed by known means using an alignment film, but when the second optical anisotropic layer is formed by being laminated on the first optical anisotropic layer, the second optical anisotropic layer is affected by the surface of the first optical anisotropic layer which is a lower layer, and thus the alignment of the liquid crystal compound in a boundary may be disturbed. In particular, when the second optical anisotropic layer is directly laminated on the first optical anisotropic layer, the influence becomes remarkable. In the present invention, for example, it is possible to solve the problem by adopting of one or a combination of two or more of the following means.

A leveling agent is blended with the first optical anisotropic layer as first means.

By blending the leveling agent with the first optical anisotropic layer, the surface of the first optical anisotropic layer becomes smooth, and in the second optical anisotropic layer, it is possible to align the liquid crystal compound with high alignment order. When the leveling agent is added, the leveling agent is rapidly and unevenly distributed on the surface of the coated composition, the leveling agent is still unevenly distributed on the surface even after drying the first optical anisotropic layer, and thus surface energy of the first optical anisotropic layer decreases by the leveling agent. Here, the surface energy ($\gamma s^v$: unit, mJ/m$^2$) is an energy conversion value (the unit of mN/m is converted into the unit of mJ/m$^2$) of surface tension of the first optical anisotropic layer defined by a value $\gamma s^v (=\gamma s^d + \gamma s^h)$ which is denoted by the sum of $\gamma s^d$ and $\gamma s^h$ obtained by Simultaneous Equations (1) and (2) described below from contact angles $\theta_{H2O}$ and $\theta_{CH2I2}$ of each of pure water H$_2$O and methylene iodide CH$_2$I$_2$ experimentally obtained on the first optical anisotropic layer with reference to D. K. Owens: J. Appl. Polym. Sci., 13, 1941 (1969). It is necessary that the humidity of a sample is adjusted for a certain period of time or more in predetermined temperature and humidity conditions before performing measurement. At this time, it is preferable that the temperature is 20° C. to 27° C. and the humidity is in a range of 50RH % to 65RH %, and it is preferable that a humidity adjustment time is greater than or equal to 2 hours.

$$1+\cos \theta H_2O = 2\sqrt{\gamma s^d}(\sqrt{\gamma_{H2O}^d/\gamma_{H2O}^h}v) + 2\sqrt{\gamma s^h}(\sqrt{\gamma_{H2O}^h/\gamma_{H2O}^v}) \tag{1}$$

$$1+\cos \theta CH_2I_2 = 2\sqrt{\gamma s^d}(\sqrt{\gamma_{CH2I2}^d/\gamma_{CH2I2}^v}) + 2\sqrt{\gamma s^h}(\sqrt{\gamma_{CH2I2}^h/\gamma_{CH2I2}^v}) \tag{2}$$

Here, $\gamma_{H2O}^d$ is 21.8°, $\gamma_{H2O}^h$ is 51.0°, $\gamma_{H2O}^v$ is 72.8°, $\gamma_{CH2I2}^d$ is 49.5°, $\gamma_{CH2I2}^h$ is 1.3°, and $\gamma_{CH2I2}^v$ is 50.8°.

The surface energy of the first optical anisotropic layer is in a range of less than or equal to 45 mJ/m$^2$, is preferably in a range of 20 mJ/m$^2$ to 45 mJ/m$^2$, and is more preferably in a range of 25 mJ/m$^2$ to 40 mJ/m$^2$. According to such a range, it is possible to align the liquid crystal compound in the second optical anisotropic layer with higher alignment order.

A fluorine-based leveling agent and silicon-based leveling agent are preferable as the leveling agent used in the present invention, and the fluorine-based leveling agent is more preferable, and in particular, a compound in which a benzene ring or a triazine ring is included, and the benzene ring or the triazine ring has at least two substituent groups including a perfluoroalkyl group is preferable. It is preferable that the substituent group including the perfluoroalkyl group is $C_nF_{2n+1}$-L-O— (L represents a group formed of a combination of —CH$_2$— and —CO—, and n represents an integer of 1 to 5). The molecular weight of the leveling agent is preferably less than or equal to 3000, and is more preferably less than or equal to 2000.

In a specific example of the leveling agent, a compound disclosed in paragraphs 0079 to 0102 of JP2007-069471A and denoted by General Formula (I) disclosed in JP2013-047204A (in particular, a compound disclosed in paragraphs 0020 to 0032), a compound denoted by General Formula (I) disclosed in JP2012-211306A (in particular, a compound disclosed in paragraphs 0022 to 0029), a liquid crystal alignment accelerator denoted by General Formula (I) disclosed in JP2002-129162A (in particular, a compound disclosed in paragraphs 0076 to 0078 and 0082 to 0084), a compound denoted by General Formulas (I) and (II) or (III) disclosed in 22005-099248A (in particular, a compound disclosed in paragraphs 0092 to 0096), and the following compounds are included as preferred examples.
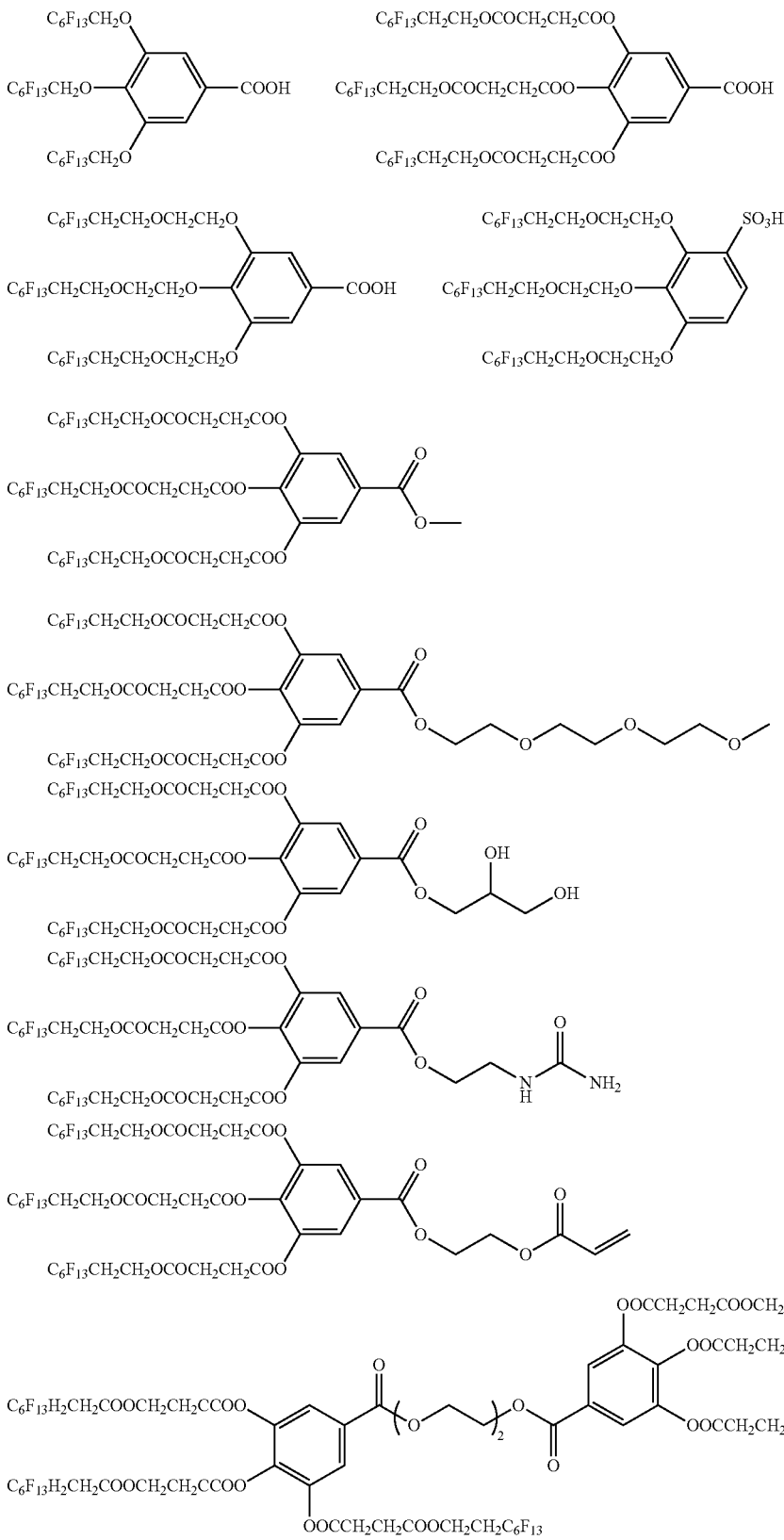

-continued
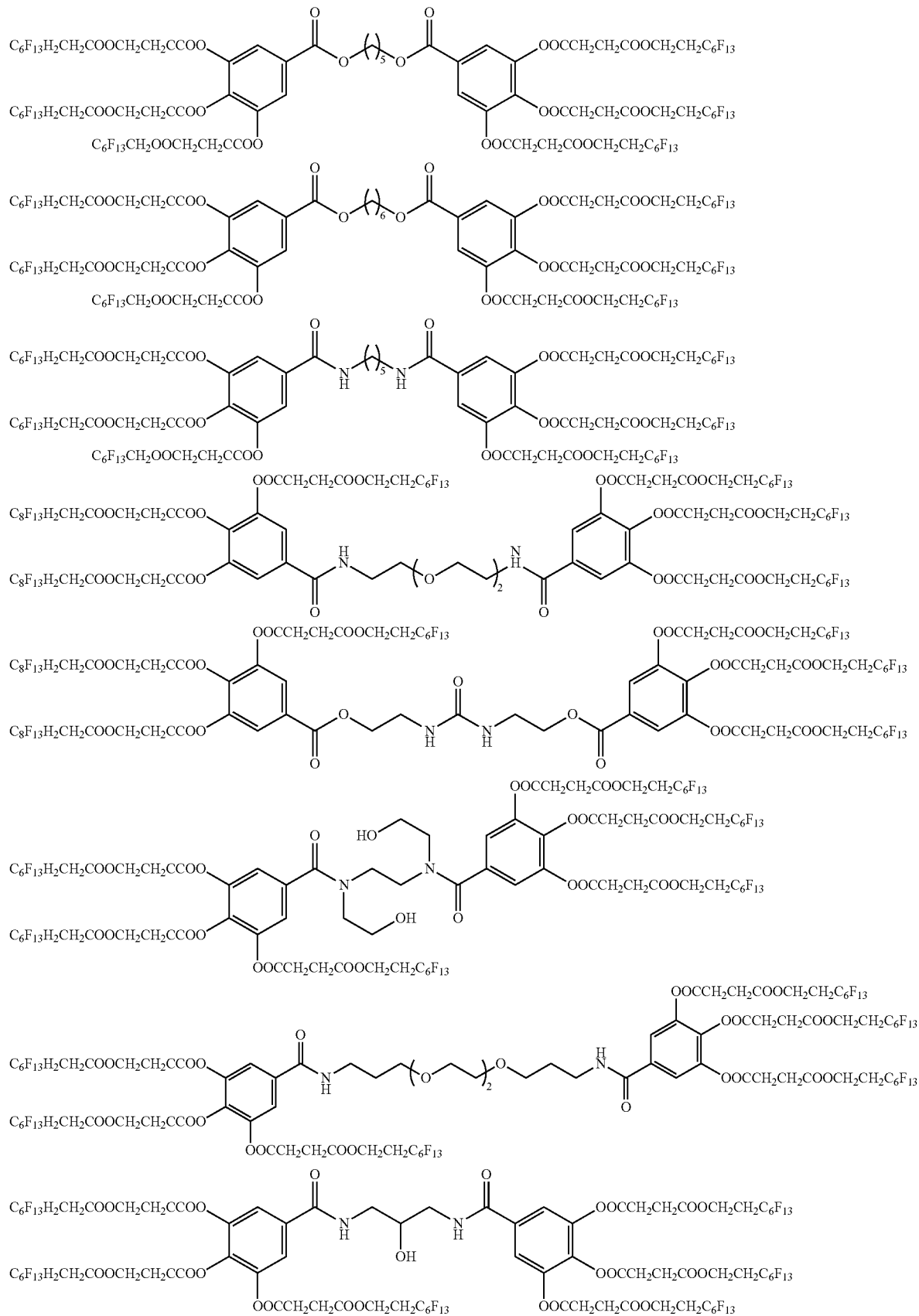

The amount of leveling agent is preferably 0.01 mass % to 5 mass %, and is more preferably 0.1 mass % to 3 mass %, with respect to the liquid crystal compound contained in the first optical anisotropic layer. Only one type of leveling agent may be contained, or two or more types thereof may be contained. When two or more types of leveling agents are contained, the total amount is in the range described above.

A vertical aligning agent is blended with the second optical anisotropic layer as second means. By blending the vertical aligning agent with the second optical anisotropic layer, it is possible to more effectively align the liquid crystal compound in the boundary of the second optical anisotropic layer. It is preferable that a boronic acid compound and/or an onium salt are used as the vertical aligning agent.

A compound denoted by the following formula is preferable as a specific example of the boronic acid compound.

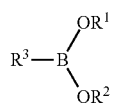

(In the formula, $R^1$ and $R^2$ each independently represent a hydrogen atom, a substituted aliphatic hydrocarbon group or an unsubstituted aliphatic hydrocarbon group, an aryl group, or a heterocyclic group. $R^3$ represents a substituent group having a functional group obtained by being bonded to a (meth)acryl group.)

A boronic acid compound denoted by General Formula (I) disclosed in paragraphs 0023 to 0032 of JP2008-225281A is able to be used as a specific example of the boronic acid compound, and an onium salt disclosed in JP2008-225281A is able to be preferably used. In addition, the following boronic acid compound is also preferably used.

A compound denoted by the following formula is preferable as a specific example of the onium salt.

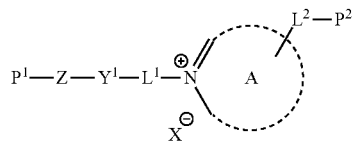

(In the formula, a ring A represents quaternary ammonium ions formed of a nitrogen-containing hetero ring, X represents anions; $L^1$ represents a bivalent linking group; $L^2$ represents a single bond or a bivalent linking group; $Y^1$ represents a bivalent linking group having a 5-membered ring or a 6-membered ring as a partial structure; Z represents a bivalent linking group having 2 to 21) alkylene groups as a partial structure; and $P^1$ and $P^2$ each independently represent a monovalent substituent group having a polymerizable ethylenically unsaturated group.)

An onium salt disclosed in paragraphs 0052 to 0058 of JP32012-208397A, an onium salt disclosed in paragraphs 0024 to 0055 of JP2008-026730A, and an onium salt disclosed in JP2002-37777A are able to be used as a specific example of the onium salt, and these ordain salts are able to be preferably used.

The amount of vertical aligning agent is preferably 0.1 mass % to 5 mass %, and is more preferably 0.5 mass % to 3 mass %, with respect to the liquid crystal compound contained in the second optical anisotropic layer. Only one type of vertical aligning agent may be contained, or two or more types thereof may be contained. When two or more types of vertical aligning agents are contained, the total amount is in the range described above.

A compound having a hydroxyl group in a lateral direction is used in the first optical anisotropic layer as third means. When the compound having a hydroxyl group in the lateral direction is included, it is assumed that the compound having hydroxyl group in the lateral direction is aligned, and

I-34)

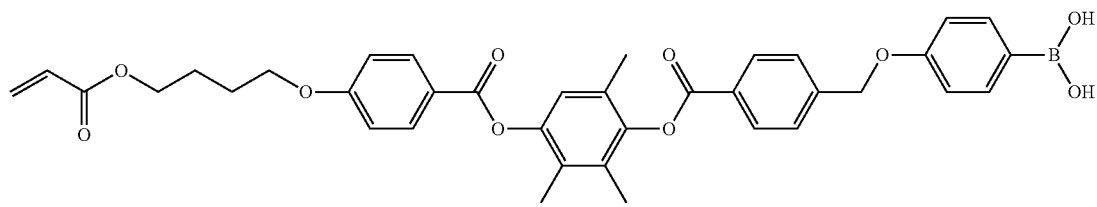

I-35)

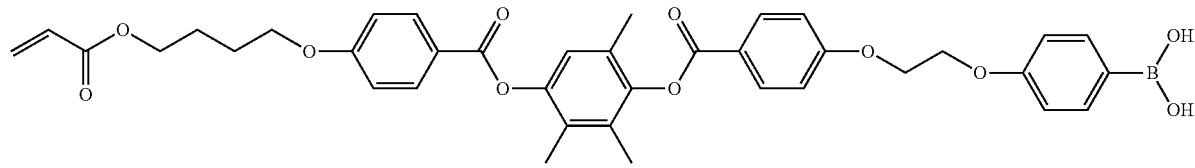

I-36)

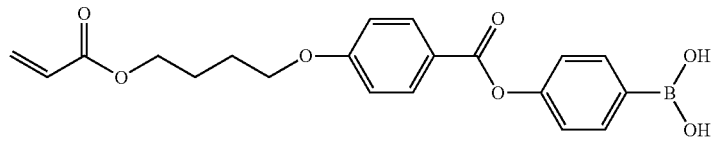

thus the hydroxyl group is regularly arranged in the boundary, and the regularly arranged hydroxyl group strongly controls the alignment of the liquid crystal compound of the second optical anisotropic layer disposed on the surface of the first optical anisotropic layer. Here, the lateral direction indicates a long axis of the molecule, for example, is a direction of approximately 90° with respect to the longest chain.

A low molecular compound having a hydrogen bonding group may be contained in the lower layer as an alignment controlling agent of the present invention.

In particular, it is preferable that a low molecular compound having a hydrogen bonding group in the lateral direction of mesogen are used.

Specifically, a structure disclosed in Journal of Materials Chemistry; 1998, Vol. 8, Page 1502, and the like may be used.

Hereinafter, a specific compound example will be shown, but the present invention is not limited thereto.

TABLE 2

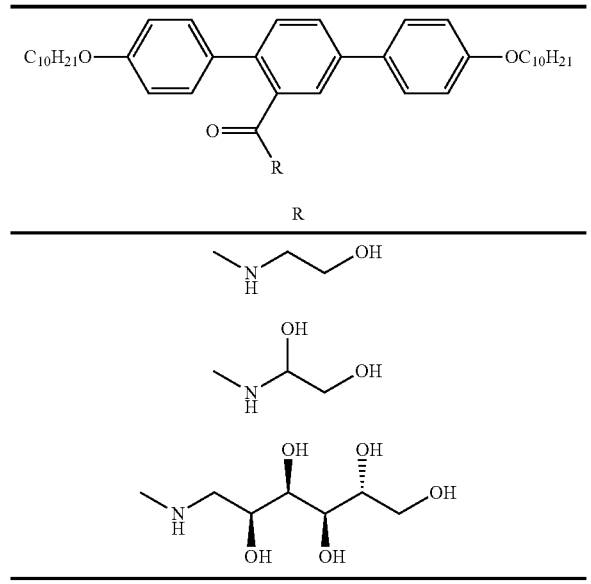

TABLE 3

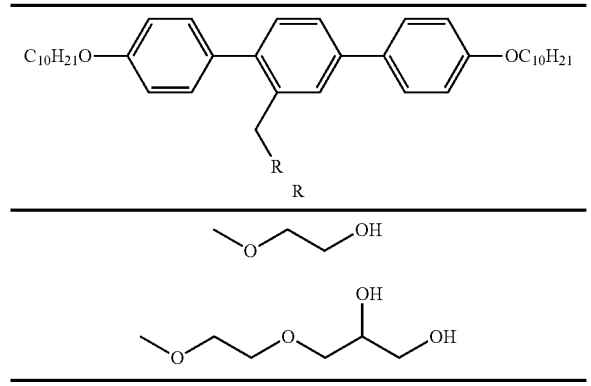

<<Manufacturing Method of First Optical Anisotropic Layer>>

Next, a manufacturing method of the first optical anisotropic layer of the present invention will be described in detail. The first optical anisotropic layer is able to be manufactured by forming the alignment film on the supporter, by applying a composition for forming the first optical anisotropic layer onto the surface of the alignment film, and by curing the composition. In addition, the first optical anisotropic layer is also able to be manufactured by performing a rubbing treatment with respect to the surface of a polarizing film (for example, a polyvinyl alcohol film), by applying the composition for forming the first optical anisotropic layer onto the surface of the polarizing film, and by curing the composition.

In the present invention, it is preferable that modified polyvinyl alcohol or unmodified polyvinyl alcohol is used as the material of the alignment film. Modified polyvinyl alcohol disclosed in paragraphs "0071" to "0095" of JP3907735B is able to be used. Modified polyvinyl alcohol having a polymerizable group may be used.

The alignment film which is able to be used in the present invention may be a photo alignment film, or may be an alignment film including a rubbing treatment surface which is subjected to a rubbing treatment. In the present invention, a general rubbing treatment method is able to be used. For example, the surface of the alignment film is able to be rubbed by a rubbing roll. In an aspect in which the alignment film is continuously formed on the supporter formed of a long polymer film, it is preferable that the direction of the rubbing treatment (a rubbing direction) is coincident with a longitudinal direction of the supporter from a viewpoint of manufacturing aptitude.

The same applies to a case where the first optical anisotropic layer is directly formed on the surface of the polarizing film.

Next, the composition for forming the first optical anisotropic layer is applied (in general, coated) onto the surface of the alignment film or the surface of the polarizing film. Examples of a coating method include known methods such as a curtain coating method, a dip coating method, a printing coating method, a spray coating method, a slot coating method, a roll coating method, a slide coating method, a blade coating method, a gravure coating method, and a wire bar method.

The composition for forming the first optical anisotropic layer essentially contains the liquid crystal compound, and as necessary, a polymerization initiator, a polymerizable compound, a solvent, and the like are blended with the liquid crystal compound. Further, as described above, it is preferable that the leveling agent, the compound having a hydroxyl group in the lateral direction, or the like is blended with the liquid crystal compound.

The liquid crystal compound for forming the first optical anisotropic layer may be a rod-like liquid crystal compound, or may be a disk-like liquid crystal compound, and the rod-like liquid crystal compound is more preferable. Furthermore, when the first optical anisotropic layer is the rod-like liquid crystal compound, it is preferable that the second optical anisotropic layer is also the rod-like liquid crystal compound, and when the first optical anisotropic layer is the disk-like liquid crystal compound, it is preferable that the second optical anisotropic layer is also the disk-like liquid crystal compound. It is preferable that the liquid crystal phase of the first optical anisotropic layer expresses a smectic phase, and in a compound having both of a nematic phase and a smectic phase, it is preferable that the first optical anisotropic layer is handled in a smectic phase state by alignment control such as heat.

The liquid crystal compound for forming the first optical anisotropic layer is preferably a liquid crystal compound exhibiting a liquid crystal state of the smectic phase, and is more preferably a compound denoted by General Formula (I) described below.

Q1-SP1-X1-M-X2-SP2-Q2  General Formula (I):

(In General Formula (I), Q1 and Q2 each represent a hydrogen atom, a halogen atom, a cyano group, or a polymerizable group, at least one of Q1 and Q2 represents a polymerizable group; SP1 and SP2 each represent a single bond or a spacer group; X1 and X2 each represent a linking group; and M represents a mesogen group.)

In General Formula (I), Q1 and Q2 each independently represents a hydrogen atom, a cyano group, a halogen atom, or a polymerizable group, and at least one of Q1 and Q2 represents a polymerizable group. It is preferable that the polymerizable group described above is able to be subjected to addition polymerization (including ring-opening polymerization) or condensation polymerization, and in other words, it is preferable that the polymerizable group is a functional group which is able to be subjected to an addition polymerization reaction or a condensation polymerization reaction. Examples of the polymerizable group are shown as follows.

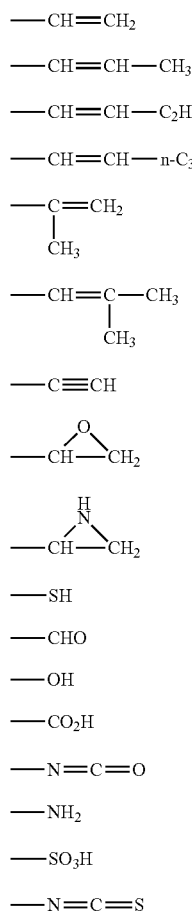

Each of the polymerizable groups Q1 and Q2 is preferably an unsaturated polymerizable group (Q-1 to Q-7), an epoxy group (Q-8) or an aziridinyl group (Q-9), or an oxetanyl group, and is more preferably an ethylenically unsaturated polymerizable group (Q-1 to Q-6) or an epoxy group. Examples of the ethylenically unsaturated polymerizable group (Q-1 to Q-6) further include (Q-101) to (Q-106) described below. Among them, (Q-101) and (Q-102) are preferable.

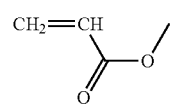

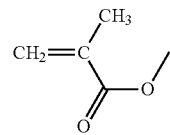

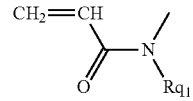

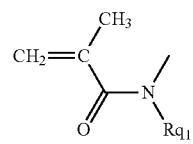

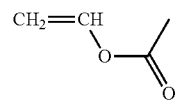

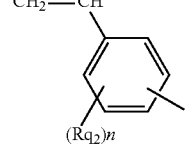

In the formula, Rq1 represents a hydrogen atom, an alkyl group, or an aryl group, Rq2 represents a substituent group, and n represents an integer of 0 to 4. Rq1 preferably represents a hydrogen atom, an alkyl group having 1 to 5 carbon atoms, and an aryl group having 6 to 12 carbon atoms, more preferably represents a hydrogen atom and an alkyl group having 1 to 3 carbon atoms, and even more preferably represents a hydrogen atom or a methyl group. Substituent groups described as examples of substituent groups $R^a$, $R^b$, and $R^c$ described below are able to be preferably used as a substituent group indicated by Rq2. n preferably represents an integer of 0 to 2, and more preferably represents 0 or 1.

In General Formula (I), SP1 and SP2 each independently represent a single bond or a spacer group. It is preferable that SP1 and SP2 each independently represent a bivalent linking group selected from a group consisting of a single bond, —O—, —S—, —CO—, —NR$^2$—, bivalent chain group, and a combination thereof. R$^2$ described above represent an alkyl group having 1 to 7 carbon atoms or a hydrogen atom.

The bivalent chain group indicates an alkylene group, a substituted alkylene group, an alkenylene group, a substituted alkenylene group, an alkynylene group, or a substituted alkynylene group. The alkylene group, the substituted alkylene group, the alkenylene group, and the substituted alkenylene group are preferable, and the alkylene group and the alkenylene group are more preferable. The alkylene group may have a branch. The number of carbon atoms of the alkylene group is preferably 1 to 12, is more preferably 2 to 10, and is most preferably 2 to 8. An alkylene portion of the substituted alkylene group is identical to the alkylene group described above. Examples of the substituent group of the substituted alkylene group include an alkoxy group and a halogen atom. The alkenylene group may have a branch. The number of carbon atoms of the alkenylene group is preferably 2 to 12, is more preferably 2 to 10, and is most preferably 2 to 8. The alkenylene portion of the substituted alkenylene group is identical to the alkenylene group described above. Examples of the substituent group of the substituted alkenylene group include an alkoxy group and a halogen atom. The alkynylene group may have a branch. The number of carbon atoms of the alkynylene group is preferably 2 to 12, is more preferably 2 to 10, midis most preferably 2 to 8. The alkynylene portion of the substituted alkynylene group is identical to the alkynylene group described above. Examples of the substituent group of the substituted alkynylene group include an alkoxy group and a halogen atom. In addition, in the bivalent chain group, one or more $CH_2$ groups which are not adjacent to each other may be substituted with —O—, —C(=O)—O—, —O—C(=O)—, —O—C(=O)—O—, —C(=O)—, and —S—. The total number of carbon atoms of the spacer group is preferably greater than or equal to 1, is more preferably 2 to 30, and is even more preferably 4 to 20.

In General Formula (I), X1 and X2 each represent a linking group. It is preferable that X1 and X2 each independently represent a bivalent linking group selected from a group consisting of a single bond, —O—, —S—, —C(=O)—, —NR$^2$— (R$^2$ is identical to that described above), and a combination thereof. The single bond, —O—, —C(=O)—O—, —O—C(=O)—, —C(=O)—NH—, —NH—C(=O)—, or —O—C(=O)—O— is more preferable.

In General Formula (I), when Q1 or Q2 represents a polymerizable group, a preferred example of —SP1-X1- or —X2-SP2- includes the following groups, but the present invention is not limited thereto. Furthermore, in the following specific examples, "*" is a bonding portion with respect to Q1 or Q2.

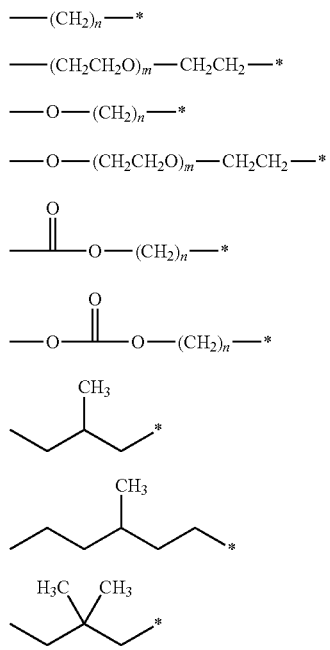

In the general formulas described above, n and m each represent an integer of greater than or equal to 1. n is preferably an integer of 1 to 20, and is more preferably an integer of 2 to 10. m is preferably an integer of 1 to 10, and is more preferably an integer of 1 to 6.

In General Formula (I), when Q1 or Q2 represents a hydrogen atom or a halogen atom, it is preferable that —SP1-X1- or —X2-SP2- bonded to the hydrogen atom or the halogen atom is an alkyl group having 1 to 10 carbon atoms which may be substituted, or an alkoxy group having 1 to 10 carbon atoms which may be substituted.

In General Formula (I), when Q1 or Q2 represents a cyano group, it is preferable that —SP1-X1- or —X2-SP2- bonded to the cyano group is a single bond.

In General Formula (I), M represents mesogen denoted by General Formula (I-1) described below.

-(A0-Z0)n1-X0-SP0-X0-(A0-Z0)n2-    General Formula (I-1):

In the formula, A0 represents a bivalent ring structure, and is preferably a 1,4-phenylene group, a 1,4-cyclohexylene group, a 2,5-pyridyl group, and a 2,5-pyrimidyl group. The ring may have a substituent group. A0 is more preferably a 1,4-phenylene group. It is preferable that at least one ring has a substituent group from a viewpoint of being easily mixed with other materials or of improving solubility with respect to a predetermined solvent.

The type of substituent group is able to be suitably selected according to desired physical properties. Examples of the substituent group include a halogen atom, a cyano group, a nitro group, an alkyl group having 1 to 5 carbon atoms, a halogen substituted alkyl group having 1 to 5 carbon atoms, an alkoxy group having 1 to 5 carbon atoms, an alkylthio group having 1 to 5 carbon atoms, an acyl group having 1 to 5 carbon atoms, an acyl oxy group having 2 to 6 carbon atoms, an alkoxy carbonyl group having 2 to 6 carbon atoms, a carbamoyl group, an alkyl substituted carbamoyl group having 2 to 6 carbon atoms, and an amide group having 2 to 6 carbon atoms. More preferably, the substituent group is a halogen atom, a cyano group, an alkyl group having 1 to 3 carbon atoms, a halogen substituted alkyl group having 1 to 3 carbon atoms, an alkoxy group having 1 to 3 carbon atoms, and an acyl oxy group having 2 to 4 carbon atoms.

Z0 represents a single bond, —O—CO—, —CO—O—, —CH=CH—, —CH=N—, —N=CH—, —CH=CH—CO—O—, —O—CO—CH=CH—, and —O—CO—O—, and preferably represents a single bond, —O—CO—, and —CO—O—.

SP0 represents a single bond or a bivalent spacer group, and the preferred range thereof is identical to that of SP1 described above. X0 represents a bivalent linking group, and the preferred range thereof is identical to that of X1 described above.

n1 and n2 each represent an integer of 1 to 4, and a plurality of A0s and Z0s may be identical to each other or different from each other.

The compound denoted by General Formula (I) is preferably a compound denoted by General Formula (II).

Q1-SP1-X1-A-B-C-(D)m1-X2-SP2-Q2    General Formula (II):

In General Formula (II), Q1 and Q2 each independently represent a hydrogen atom, a cyano group, a halogen atom, or a polymerizable group, and at least one of Q1 and Q2 represents a polymerizable group. The detailed description and the preferred range of the polymerizable group are identical to those in General Formula (I) described above.

m1 represents an integer of 1 to 5.

In General Formula (II), SP1 and SP2 each represent a single bond or a spacer group, and X1 and X2 each represent a linking group. The detailed description and the preferred range of SP1, SP2, X1, and X2 are identical to those in General Formula (I) described above.

In General Formula (II), A, B, C, and D each represent a bivalent group selected from the following formulas IIa, IIb, and IIc.

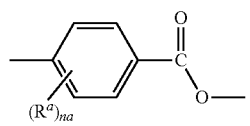

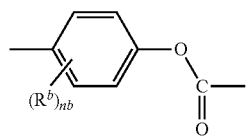

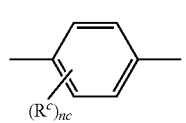

In the formulas, $R^a$, $R^b$, and $R^c$ each represent a substituent group, na, nb, and nc each represent an integer of 0 to 4, and when na, nb, and nc each represent an integer of greater than or equal to 2, a plurality of Ras, Rbs, and Rcs may be identical to each other or different from each other.

When the compound denoted by General Formula (II) described above includes a plurality of ester bonds (—C(=O)O— or —OC(=O)—), and when the sequences of atoms in the plurality of ester bonds are identical to each other, the smectic phase is easily formed. Furthermore, in the formulas, a structure in which D represents IIa and X2 represents a single bond is identical to a structure in which D represents IIc and X2 represents —C(=O)O—, and in this case, the structure in which D represents IIa and X2 represents a single bond is considered. A structure in which D represents IIb and X2 represents a single bond and a structure in which D represents IIc and X2 represents —OC(=O)— are considered as the former structure.

In General Formula (II), it is preferable that at least one of A, B, C, and D has a substituent group (that is, it is preferable that at least one of na, nb, and nc is an integer of greater than or equal to 1). By introducing the substituent group, it is possible to be easily mixed with other materials or to improve solubility with respect to a predetermined solvent, and the compound is easily prepared as the liquid crystal composition. In addition, by changing the type of substituent group, it is possible to change a phase transition temperature. The type of substituent group is able to be suitably selected according to desired physical properties. Examples of the substituent group each represented by Ra, Rb, and Rc include a halogen atom, a cyano group, a nitro group, an alkyl group having 1 to 5 carbon atoms, a halogen substituted alkyl group having 1 to 5 carbon atoms, an alkoxy group having 1 to 5 carbon atoms, an alkylthio group having 1 to 5 carbon atoms, an acyl group having 1 to 5 carbon atoms, an acyl oxy group having 2 to 6 carbon atoms, an alkoxy carbonyl group having 2 to 6 carbon atoms, carbamoyl group, an alkyl substituted carbamoyl group having 2 to 6 carbon atoms, and an amide group having 2 to 6 carbon atoms. More preferably, the substituent group is a halogen atom, cyano, an alkyl group having 1 to 3 carbon atoms, a halogen substituted alkyl group having 1 to 3 carbon atoms, an alkoxy group having 1 to 3 carbon atoms, or an acyl oxy group having 2 to 4 carbon atoms.

In General Formula (II), when m1 represents 0, it is preferable that A, B, and C are configured only of IIa or configured of a combination of IIa and IIc. The preferred combination as -A-B-C- is as follows. Furthermore, it is considered that all of the following examples are molecular structures in which the sequences of the arrangement of the atoms in the plurality of ester bonds are identical to each other, and the smectic phase is easily formed. Furthermore, in the formulas, as described above, a plurality of $R^a$s, $R^b$s, $R^c$s, nas, nbs, and ncs may be identical to each other or different from each other.

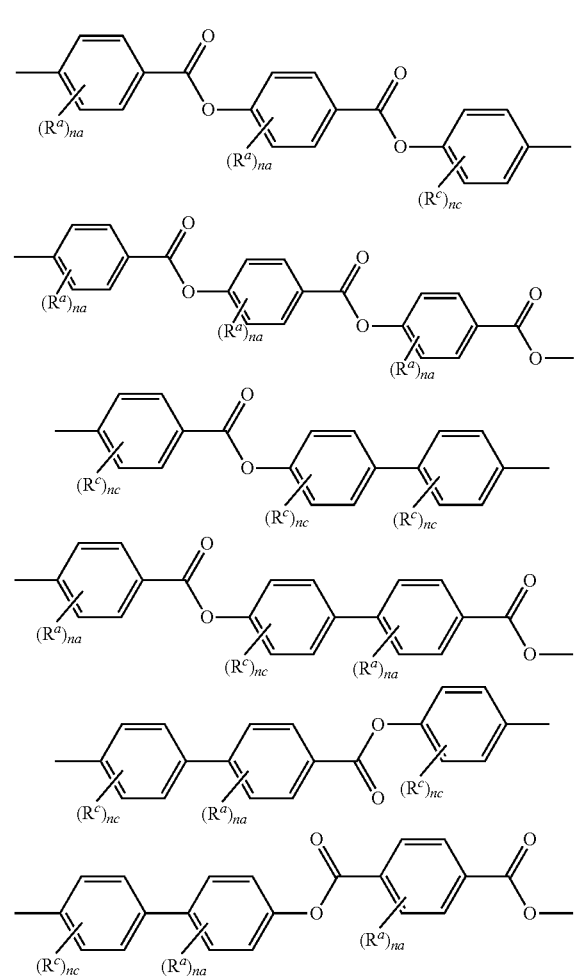

-continued

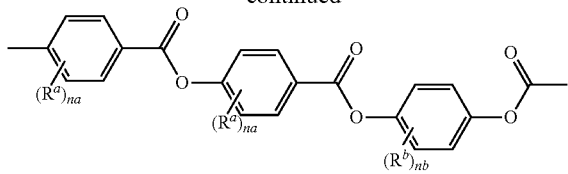

In General Formula (II), when m1 represents 1, it is preferable that at least two of A, B, C, and D are bivalent groups denoted by the formula IIa, or at least two of A, B, C, and D are bivalent groups denoted by the formula IIb. In addition, it is preferable that A, B, C, and D are configured only of IIa or configured of a combination of IIa and IIc from a viewpoint of synthesis, and it is more preferable that A, B, C, and D are configured of the combination of IIa and IIc.

In General Formula (II), when m1 represents 1, a preferred combination as -A-B-C-D- is as follows. Furthermore, it is considered that all of the following examples are molecular structures in which the sequences of the arrangement of the atoms in the plurality of ester bonds are identical to each other, and the smectic phase is easily formed. Furthermore, in the formulas, as described above, a plurality of $R^a$s, $R^b$s, $R^c$s, nas, nbs, and ncs may be identical to each other or different from each other.

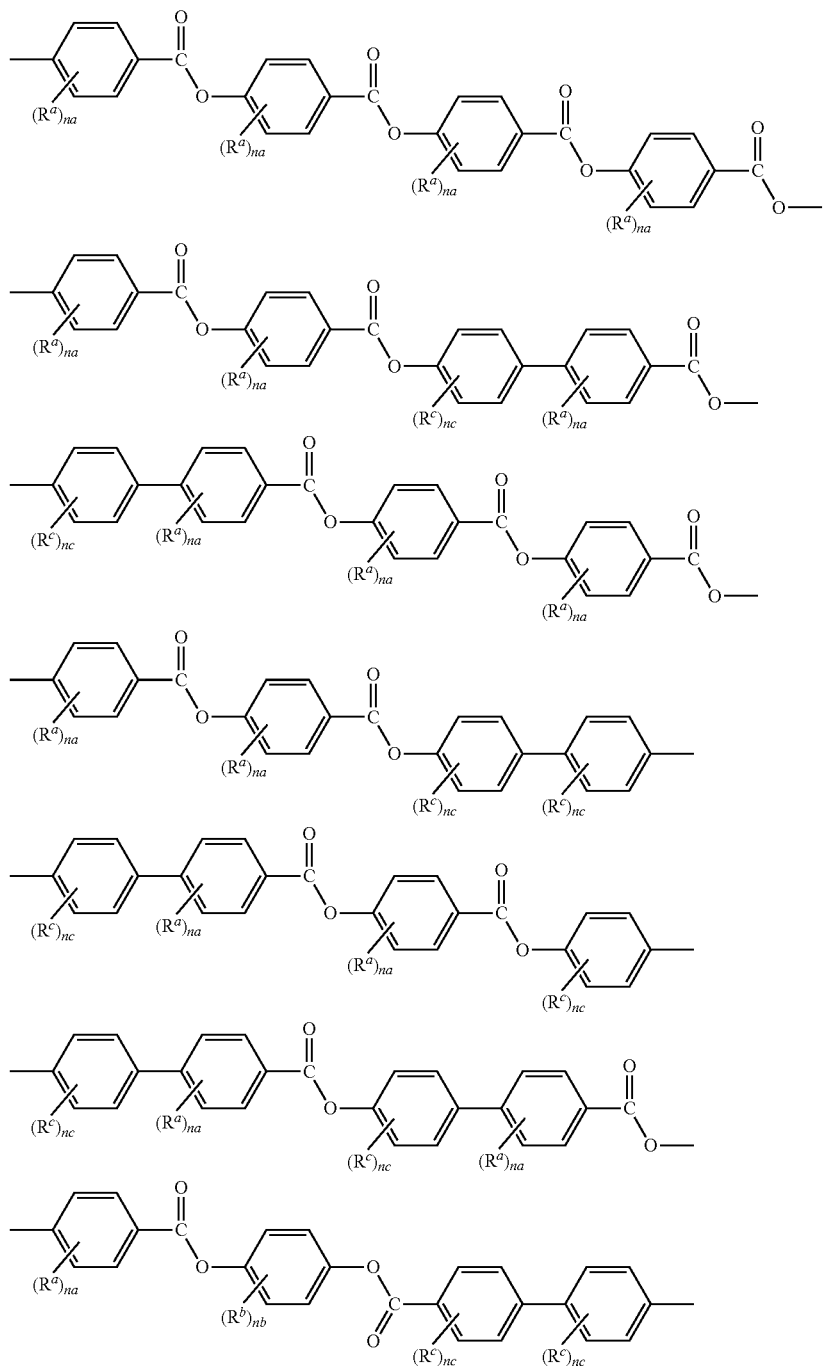

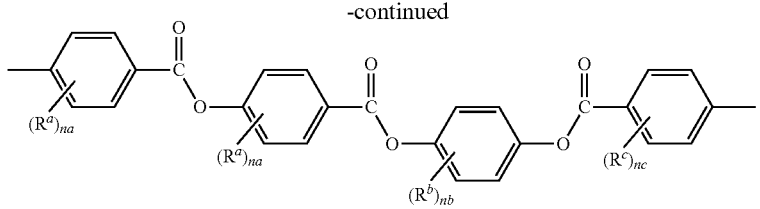

It is more preferable that the compound denoted by General Formula (I) is a compound denoted by General Formula (III).

Q1-SP1-X1-A1-B1-C1-(D1)m1-Y1-L-Y2-(D2)m2-C2-B2-A2-X2-SP2-Q2     General Formula (III):

In General Formula (III), Q1 and Q2 each independently represent a hydrogen atom, a cyano group, a halogen atom, or a polymerizable group, and at least one of Q1 and Q2 represents a polymerizable group. The detailed description and the preferred range of the polymerizable group are identical to those in General Formula (I) described above.

In General Formula (III), SP1 and SP2 each represent a single bond or a spacer group, and X1, X2, Y1, and Y2 each represent a linking group. The detailed description and the preferred range of the SP1, SP2, X1, and X2 are identical to those in General Formula (I) described above. The detailed description and the preferred range of Y1 and Y2 are identical to those of X1 and X2 in General Formula (I) described above.

In General Formula (III), L represents a spacer group having a chain structure having atoms of greater than or equal to 4, and is preferably a bivalent linking group selected from a group consisting of —O—, —S—, —CO—, —NR$^2$—, a bivalent chain group, and a combination thereof. R$^2$ described above represents an alkyl group having 1 to 7 carbon atoms or a hydrogen atom. The bivalent chain group is identical to that described as the bivalent chain group of SP1 and SP2 in General Formula (I), and the preferred range is also identical to that of SP1 and SP2 in General Formula (I). It is preferable that L includes a bivalent chain group, and it is preferable that L includes —(CH$_2$)n-, —(C$_a$H$_{2a}$X)n-, or a combination of two or more thereof. Here, n represents an integer of greater than or equal to 2 (preferably 2 to 20), and in the compound denoted by General Formula when a plurality of ns described above exist, ns may be identical to each other or different from each other, respectively. a represents an integer of greater than or equal to 2 (preferably 2 to 16). X represents —O—, —CO—O—, —O—CO—, —O—CO—O—, —CO—, or —S—, and preferably represents —O— or —S—. Furthermore, a hydrogen atom H in the formula, may be substituted with art alkyl group having C1 to C6, such as methyl or ethyl, and a part of a C—C bond in the formula may be substituted with a C=C bond.

In General Formula (III) described above, it is preferable that —Y1-L-Y2- is a group selected from Group (III-1).

Group (III-1):

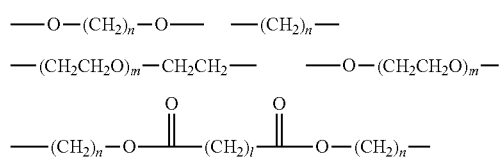

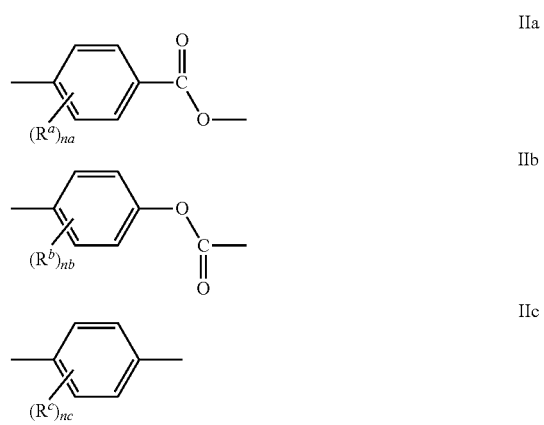

In the formula described above, n and m each represent an integer of greater than or equal to 1, and l represents an integer of greater than or equal to 0. Preferably, n is an integer of 1 to 20, m is an integer of 1 to 5, and l is an integer of 0 to 6.

In the General Formula (III) described above, A1, A2, B1, B2, C1, C2, D1, and D2 each represent a bivalent group selected from the following formulas IIa, IIb, and IIc.

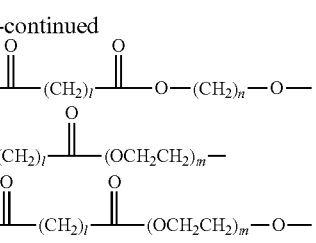

In the formula, R$^a$, R$^b$, and R$^c$ each represent a substituent group, na, nb, and nc each represent an integer of 0 to 4, and when na, nb, and nc each represent an integer of greater than or equal to 2, a plurality of Ras, Rbs, and Rcs may be identical to each other or different from each other, respectively.

In General Formula (III) described above, substituent groups of the formulas IIa, IIb, and IIc described above, that is, Ra, Rb, and Rc, are introduced to A1, A2, B1, B2, C1, C2, D1, and D2, and thus it is possible to be easily mixed with other materials or to improve solubility with respect to a predetermined solvent, and the compound is easily prepared as the liquid crystal composition. In addition, it is possible to change a phase transition temperature by changing the type of substituent group. The type of substituent group is able to be suitably selected according to desired physical properties. Furthermore, the substituent groups each represented by R$^a$, R$^b$, and R$^c$ are identical to those described in General Formula (II) described above.

When the compound of General Formula (III) described above has a plurality of ester bonds (—C(=O)O— or —OC(=O)—), and when the sequences of atoms in the plurality of ester bonds are identical to each other, the smectic phase is easily formed. Furthermore, in the formulas, a structure in which D1 represents IIa and Y1 represents a single bond is identical to a structure in which D1 represents IIc and Y1 represents —C(=O)O—, and in this case, the structure in which D1 represents IIa and Y1 represents a single bond is considered. A structure in which D1 represents IIb and X2 represents a single bond and a structure in which D1 represents IIc and X2 represents —OC(=O)— are considered as the former structure.

In General Formula (III), m1 and m2 each independently represent 0 or 1.

In General Formula (III), when m1 represents 0, it is preferable that corresponding A1, B1, and C1 are configured only of IIa or configured of a combination of IIa and IIc. A preferred combination as -A1-B1-C1- is identical to the preferred range of -A-B-C- in General Formula (II) described above. Furthermore, as described above, a plurality of $R^a$s, $R^b$s, $R^c$s, nas, nbs, and ncs may be identical to each other or different from each other.

In General Formula (III), when m2 represents 0, the preferred range of A2, B2, and C2 is identical to that of A1, B1, and C1 described above. When both of m1 and m2 represent 0, -A1-B1-C1- may be identical to or different from -A2-B2-C1-, and it is preferable that -A1-B1-C1- is identical to -A2-B2-C1- from a viewpoint of synthesis.

In General Formula (III), when m1 represents 1, A1, B1, C1, and D1 each represent a bivalent group selected from the formulas IIa, IIb, and IIc described above, and at least two of A1, B1, C1, and D1 represent a bivalent group denoted by the formula IIa or at least two of A1, B1, C1, and D1 represent a bivalent group denoted by the formula IIb. Similarly, in General Formula (III), when m2 represents 1, A2, B2, C2, and D2 each represent a bivalent group selected from the formulas IIa, IIb, and IIc, and at least two of A2, B2, C2, and D2 represent a bivalent group denoted by the formula IIa or at least two of A2, B2, C2, and D2 represent a bivalent group denoted by the formula IIb.

In General Formula (III), when nil represents 1, it is preferable that A1, B1, C1, and D1 are configured only of IIa or configured of a combination of IIa and IIc from a viewpoint of synthesis, and it is more preferable that A1, B1, C1, and D1 are configured of a combination of IIa and IIc. A preferred combination as -A1-B1-C1-D1- is identical to the preferred range as -A-B-C-D- in General Formula (II) described above. Furthermore, in the formula, as described above, a plurality of $R^a$s, $R^b$s, $R^c$s, nas, nbs, and ncs may be identical to each other or different from each other.

In General Formula (III), when m2 represents 1, a preferred combination as -D2-C2-B2-A2- is identical to that as -A1-B1-C1-D1- described above. When both of m1 and m2 represent 1, -A1-B1-C1-D1- may be identical to or different from -D2-C2-B2-A2-, and it is preferable that -A1-B1-C1-D1- is identical to -D2-C2-B2-A2- from a viewpoint of synthesis.

In General Formula (III), m1 and m2 may be different from each other, and it is preferable that m1 and m2 are identical to each other from a viewpoint of synthesis.

Examples of the compound denoted by General Formula (II) described above and General Formula (III) described above are able to include a compound disclosed in paragraphs "0033" to "0039" of JP2008-19240A, a compound disclosed in paragraphs "0037" to "0041" of JP2008-214269A, a compound disclosed in paragraphs "0033" to "0040" of JP2006-215437A, or the following structures, but the present invention is not limited thereto.

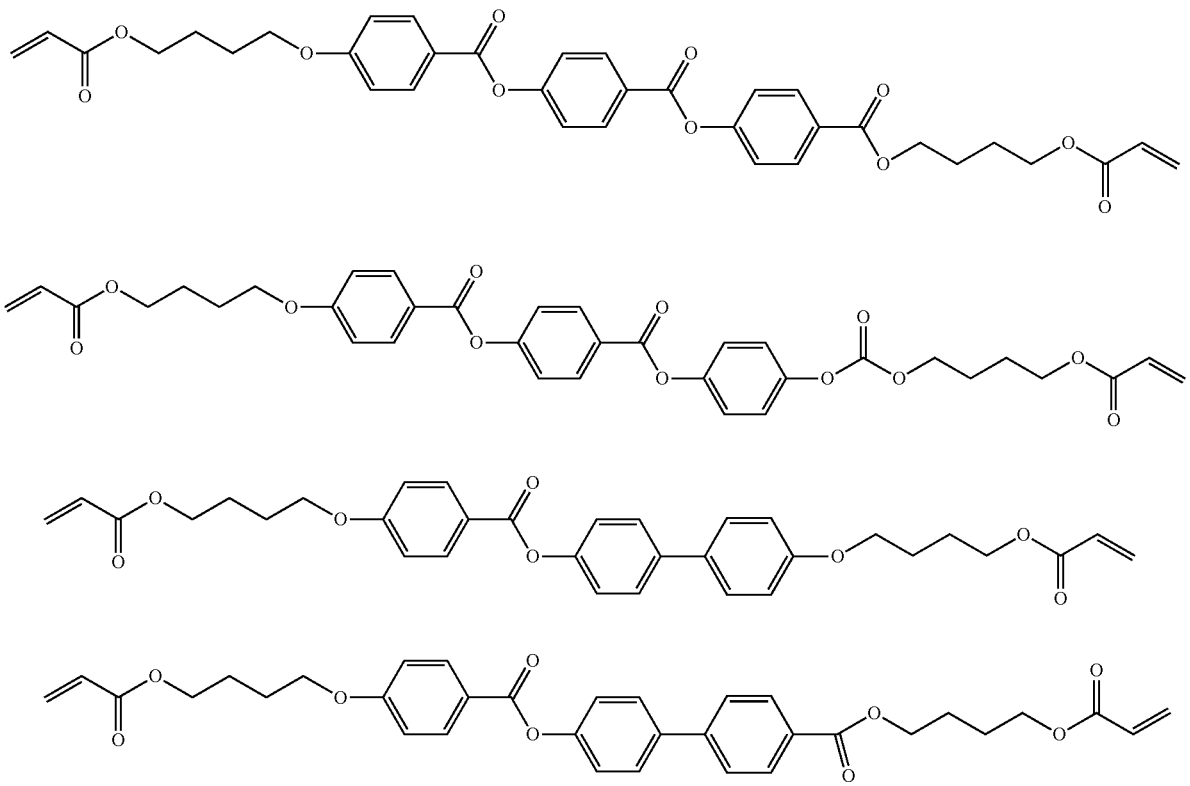

-continued
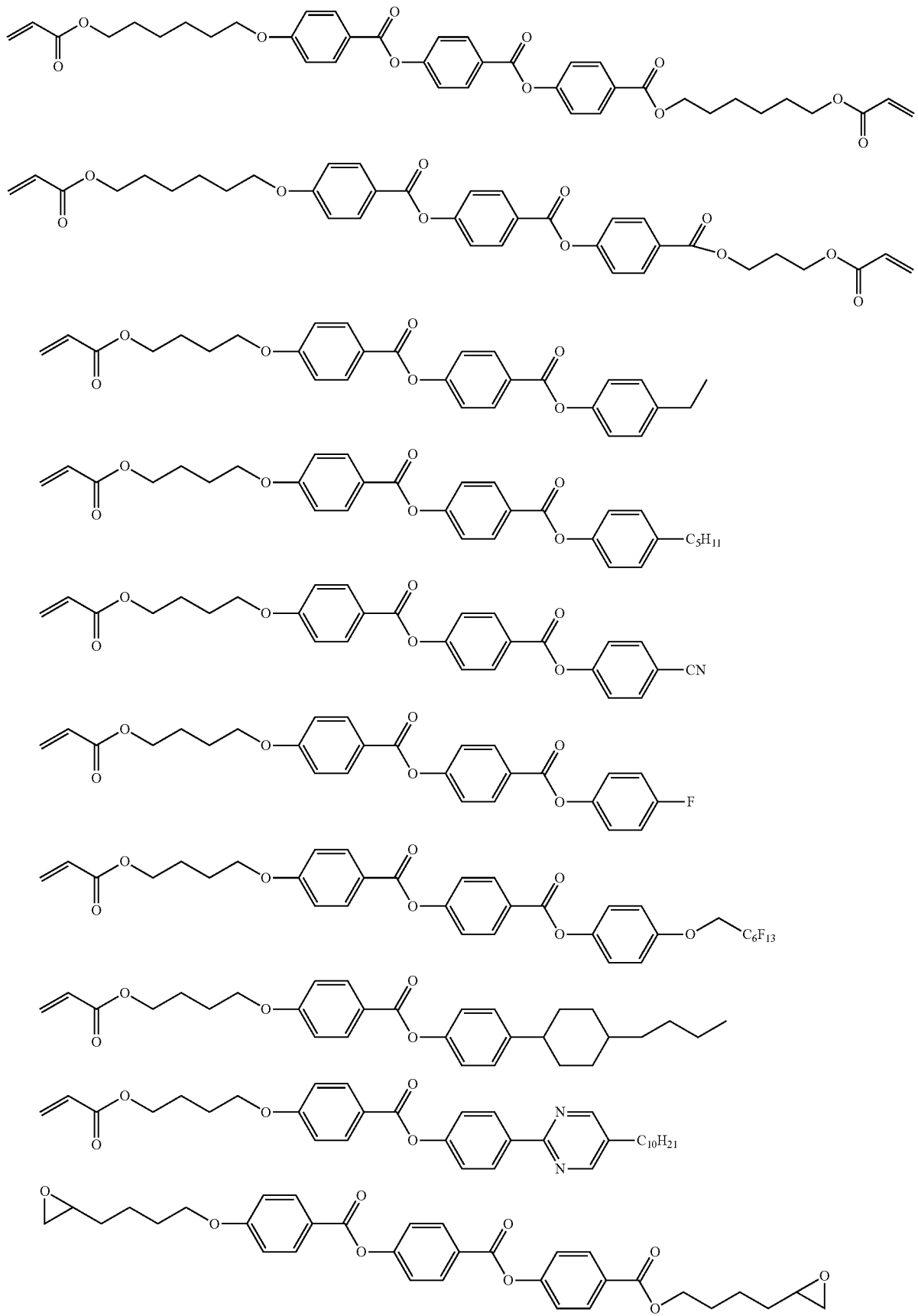

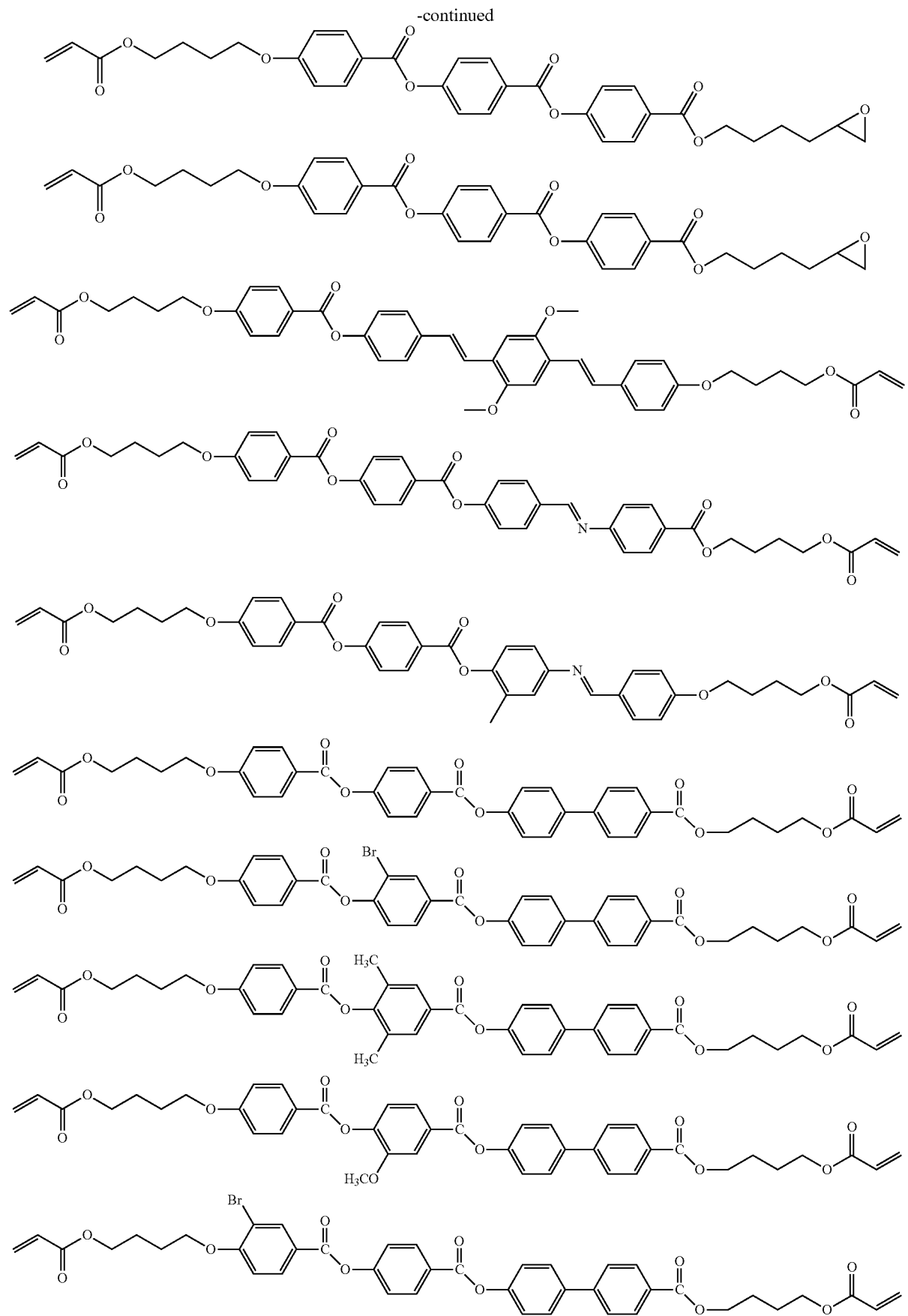

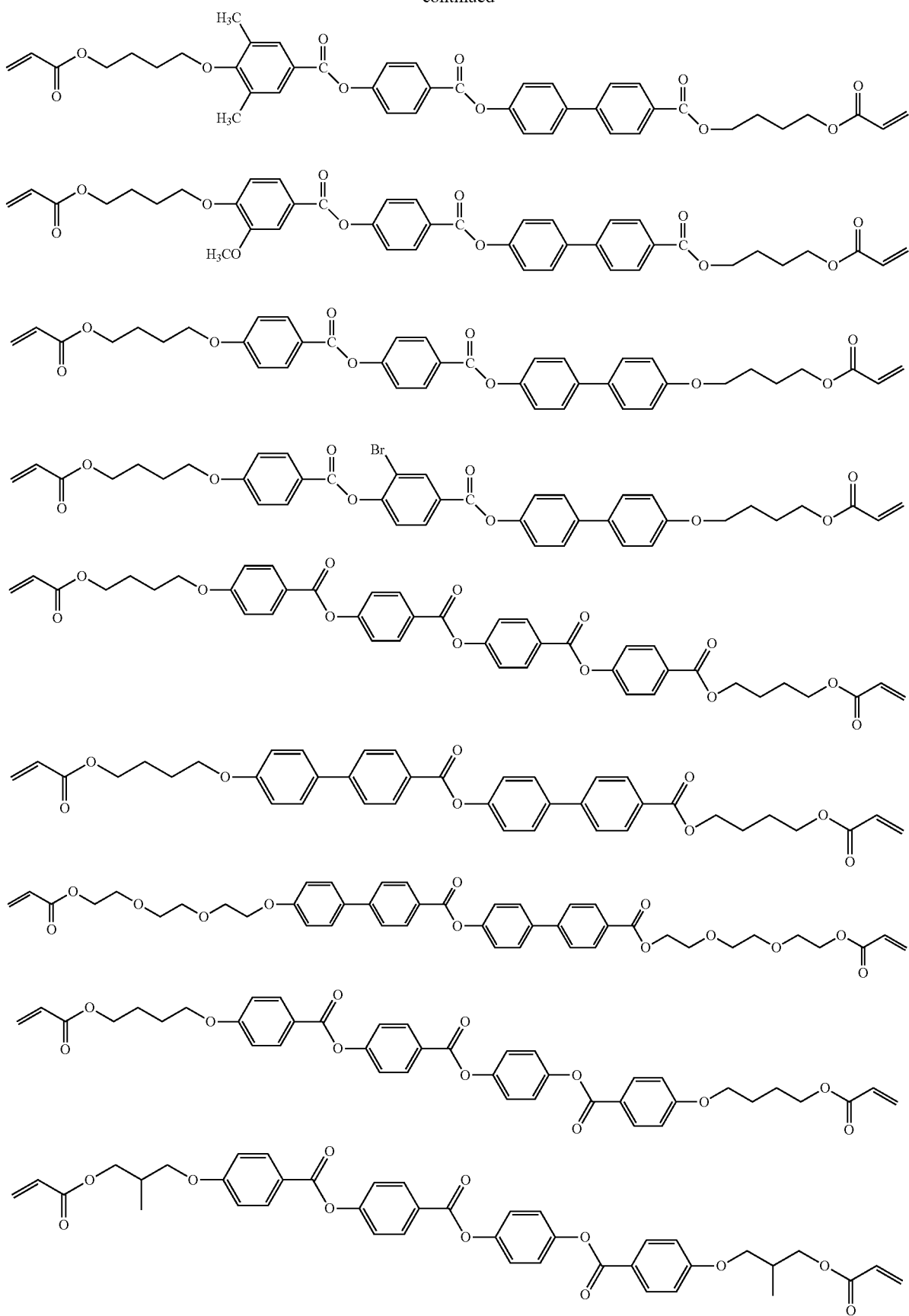

-continued
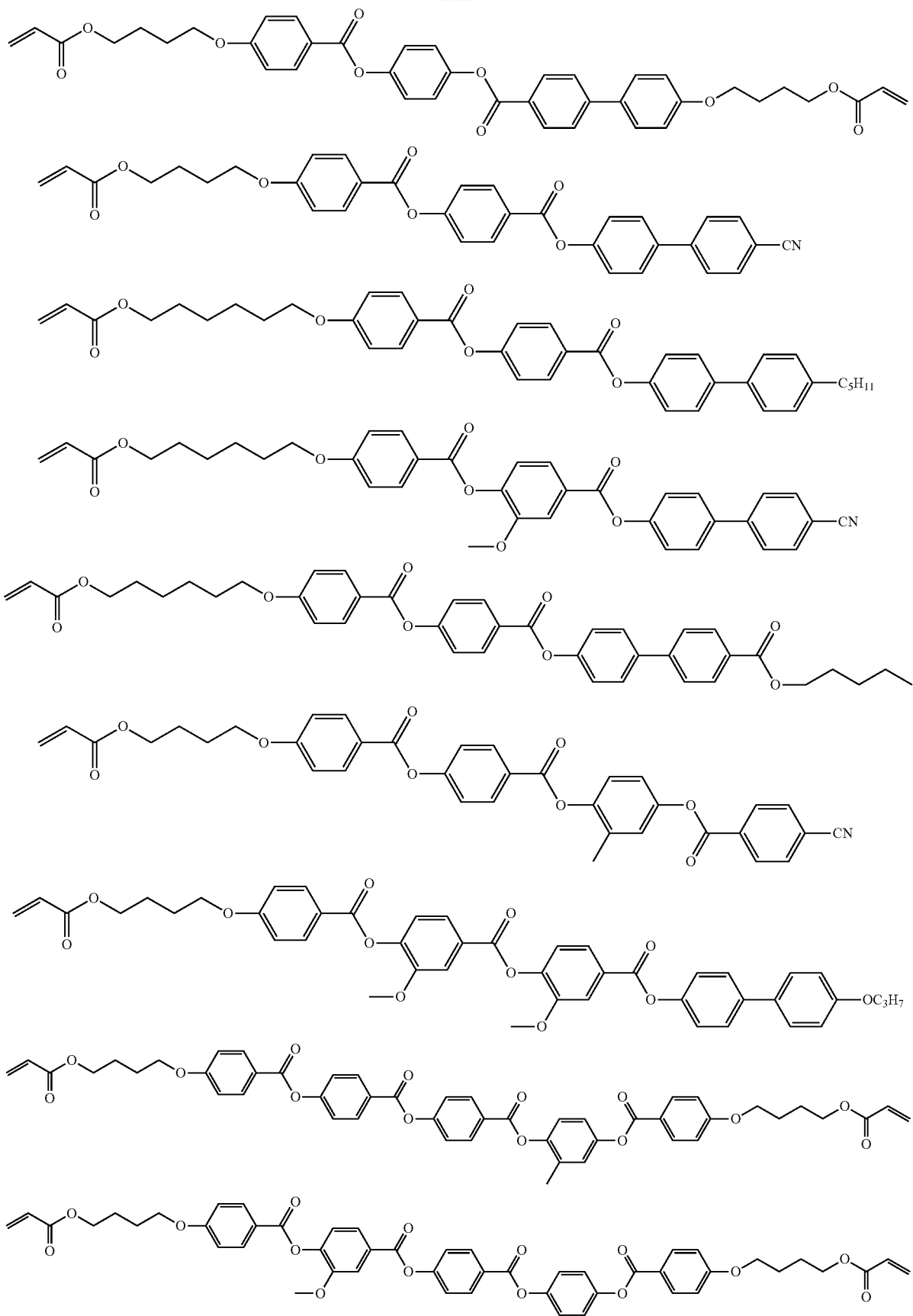

-continued
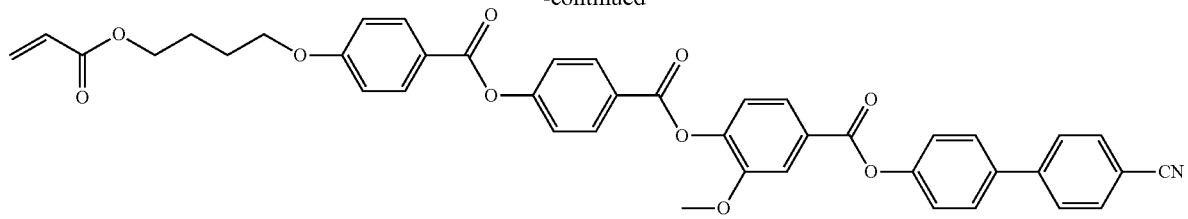
TABLE 4
| n | m | R |
|---|---|---|
| 4 | 4 | H |
| 4 | 6 | H |
| 4 | 10 | H |
| 6 | 10 | H |
| 6 | 12 | H |
| 4 | 8 | OCH$_3$ |
| 4 | 12 | OCH$_3$ |
| 6 | 10 | Br |
| 6 | 12 | Br |
| 8 | 12 | OCH$_3$ |
TABLE 5
| SP | L | R |
|---|---|---|
| —(CH$_2$)$_4$— | —(CH$_2$)$_3$— | H |
| —(CH$_2$)$_4$— | —(CH$_2$)$_3$— | Br |
| —(CH$_2$)$_4$— | —(CH$_2$)$_3$— | OCH$_3$ |
| —CH$_2$CH(CH$_3$)CH$_2$— | —(CH$_2$)$_3$— | H |
| —(CH$_2$CH$_2$O)$_2$CH$_2$CH$_2$— | —(CH$_2$)$_4$— | H |
| —(CH$_2$CH$_2$O)$_2$CH$_2$CH$_2$— | —(CH$_2$CH$_2$O)$_2$CH$_2$CH$_2$— | H |
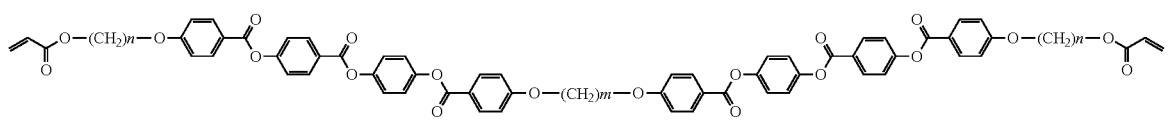
n = 4, m = 8
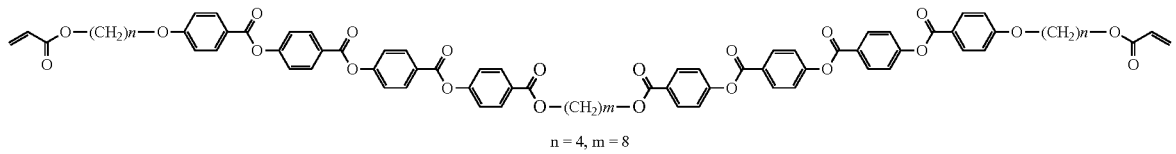
n = 4, m = 8
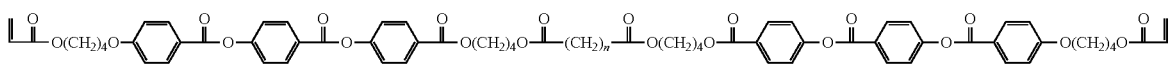
(1) n = 2
(2) n = 3
(3) n = 4

TABLE 5-continued

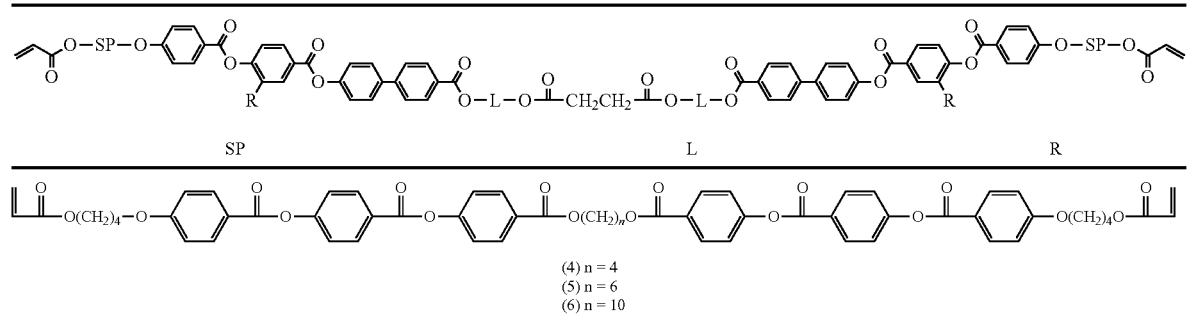

| SP | L | R |
|---|---|---|

(4) n = 4
(5) n = 6
(6) n = 10

The compound denoted by General Formulas (I) to (III) described above is able to be synthesized by combining known synthesis reactions. That is, the compound is able to be synthesized with reference to methods disclosed in various literatures (for example, Methoden der Organischen Chemie (edited by Houben-Weyl), Some specific methods (Thieme-Verlag, written by Stuttgart), and Experimental Chemistry and New Experimental Chemistry). In addition, a synthesis method is able to refer to methods disclosed in each specification of U.S. Pat. No. 4,683,327A, U.S. Pat. No. 4,983,479A, U.S. Pat. No. 5,622,648A, U.S. Pat. No. 5,770,107A, WO95/22586A, WO97/00600A, WO98/47979A, and GB2297549A.

It is more preferable that the compound denoted by General Formulas (I) to (III) described above is a liquid crystal compound which is transitioned to a smectic phase in a temperature range of 80° C. to 180° C. (more preferably 70° C. to 150° C.). It is preferable that the compound is able to be transitioned to the smectic phase in such a temperature range, since it is possible to stably manufacture an anisotropy material using anisotropy expressed by the smectic phase without performing excessive heating or excessive cooling.

In addition, a reactive mesogen compound disclosed in paragraphs 0013 to 0030 of JP1998-319408A (JP-H10-319408A), a reactive mesogen compound (in particular, the following compound) disclosed in JP2000-514202A, and a photochemical oligomer forming or polymerizable liquid crystal disclosed in JP2001-527570A, and in particular, compounds disclosed in examples are exemplified as the liquid crystal compound used in the first optical anisotropic layer of the present invention, and the contents thereof are incorporated herein.

Further, the liquid crystal compound used in the first optical anisotropic layer of the present invention may be a side chain type liquid crystal oligomer or the like disclosed in JP1994-331826A (JP-1106-331826A).

A compound denoted by General Formula (II) disclosed in JP2008-050553A is exemplified as the disk-like liquid crystal compound used in the first optical anisotropic layer, and the same preferred range of the compound applies to that of the disk-like liquid crystal compound.

Hereinafter, specific examples of the disk-like liquid crystal compound used in the present invention will be described in detail, but the present invention is not limited to the following specific examples. In the following compounds, unless otherwise stated, the number in parentheses ( ) indicates an exemplificative compound (x).

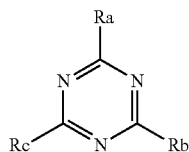

(Here, Ra, Rb, and Rc each represent groups shown in tables described below.)

TABLE 6

| Exemplificative Compound | Ra | Rb | Rc |
|---|---|---|---|
| (1) | T-1 | T-1 | T-1 |
| (2) | T-2 | T-2 | T-2 |
| (3) | T-3 | T-3 | T-3 |
| (4) | T-4 | T-4 | T-4 |
| (5) | T-5 | T-5 | T-5 |
| (6) | T-6 | T-6 | T-6 |
| (7) | T-7 | T-7 | T-7 |
| (8) | T-8 | T-8 | T-8 |
| (9) | T-9 | T-9 | T-9 |
| (10) | T-10 | T-10 | T-10 |
| (11) | T-11 | T-11 | T-11 |
| (12) | T-12 | T-12 | T-12 |
| (13) | T-13 | T-13 | T-13 |
| (14) | T-14 | T-14 | T-14 |
| (15) | T-15 | T-15 | T-15 |
| (16) | T-15 | T-15 | T-43 |
| (17) | T-15 | T-15 | T-50 |
| (18) | T-16 | T-16 | T-16 |
| (19) | T-17 | T-17 | T-17 |
| (20) | T-18 | T-18 | T-18 |
| (21) | T-18 | T-18 | T-43 |
| (22) | T-18 | T-18 | T-44 |
| (23) | T-18 | T-18 | T-45 |
| (24) | T-18 | T-18 | T-46 |
| (25) | T-18 | T-18 | T-47 |
| (26) | T-18 | T-18 | T-48 |
| (27) | T-18 | T-18 | T-49 |
| (28) | T-18 | T-18 | T-50 |
| (29) | T-18 | T-18 | T-29 |
| (30) | T-18 | T-18 | T-30 |
| (31) | T-18 | T-18 | T-3 |
| (32) | T-19 | T-19 | T-19 |
| (33) | T-20 | T-20 | T-20 |
| (34) | T-21 | T-21 | T-21 |
| (35) | T-22 | T-22 | T-22 |
| (36) | T-23 | T-23 | T-23 |
| (37) | T-24 | T-24 | T-24 |
| (38) | T-25 | T-25 | T-25 |
| (39) | T-26 | T-26 | T-26 |
| (40) | T-27 | T-27 | T-27 |

TABLE 7
| Exemplificative Compound | Ra | Rb | Rc |
|---|---|---|---|
| (41) | T-27 | T-27 | T-46 |
| (42) | T-27 | T-27 | T-47 |
| (43) | T-27 | T-46 | T-46 |
| (44) | T-28 | T-28 | T-28 |
| (45) | T-29 | T-29 | T-29 |
| (46) | T-30 | T-30 | T-30 |
| (47) | T-31 | T-31 | T-31 |
| (48) | T-32 | T-32 | T-32 |
| (49) | T-33 | T-33 | T-33 |
| (50) | T-34 | T-34 | T-34 |
| (51) | T-35 | T-35 | T-35 |
| (52) | T-36 | T-36 | T-36 |
| (53) | T-37 | T-37 | T-37 |
| (54) | T-38 | T-38 | T-38 |
| (55) | T-39 | T-39 | T-39 |
| (56) | T-40 | T-40 | T-40 |
| (57) | T-41 | T-41 | T-41 |
| (58) | T-42 | T-42 | T-42 |
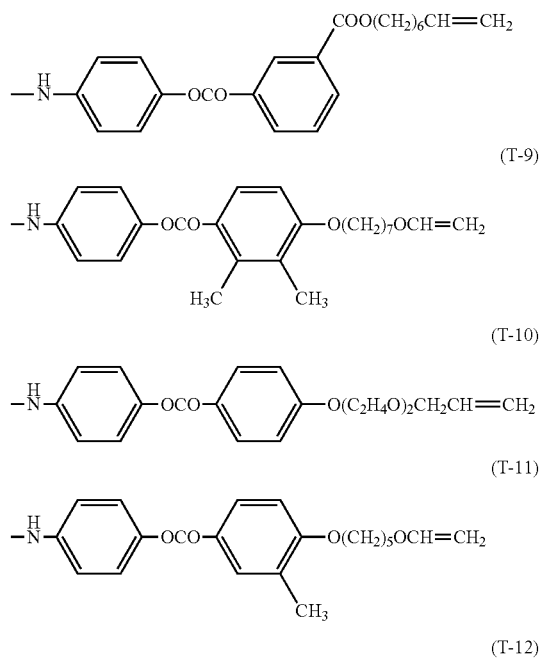
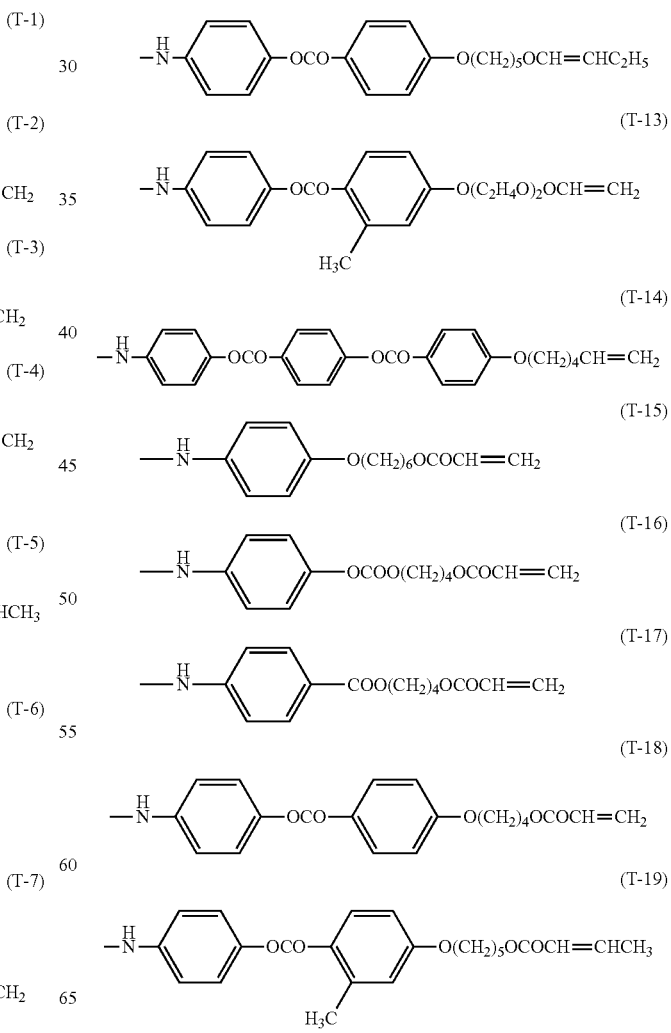

(T-20) 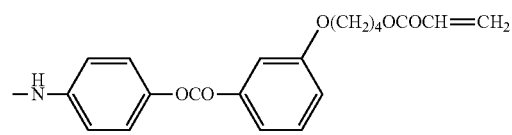
(T-21) 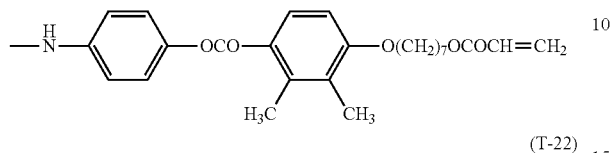
(T-22) 
(T-23) 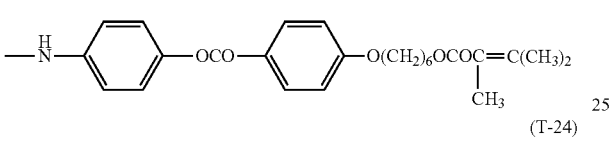
(T-24) 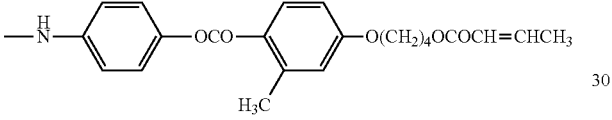
(T-25) 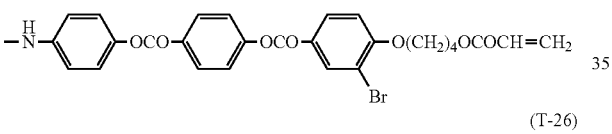
(T-26) 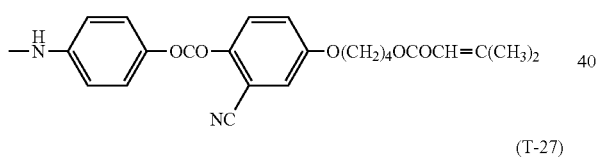
(T-27) 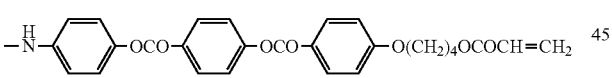
(T-28) 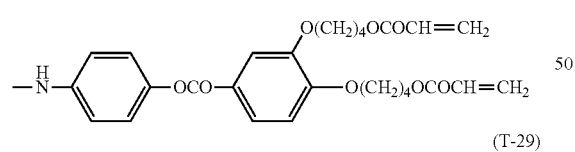
(T-29) 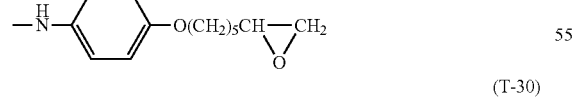
(T-30) 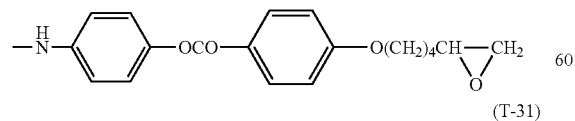
(T-31) 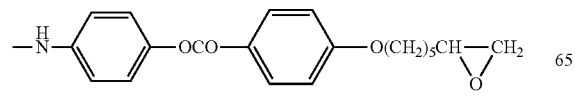
(T-32) 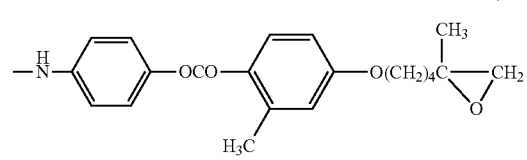
(T-33) 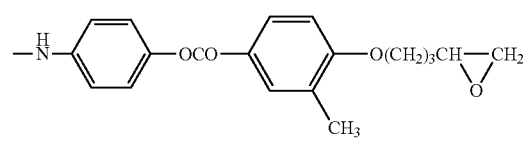
(T-34) 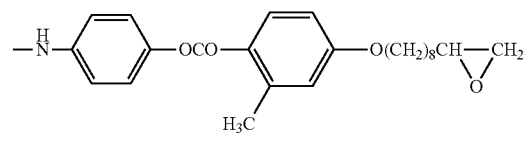
(T-35) 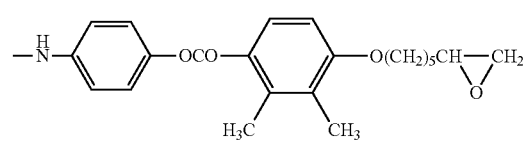
(T-36) 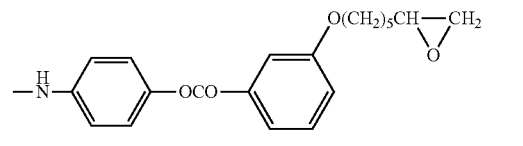
(T-37) 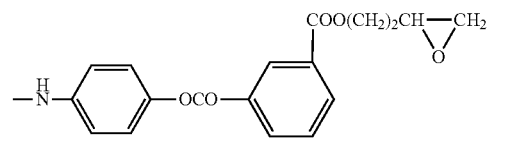
(T-38) 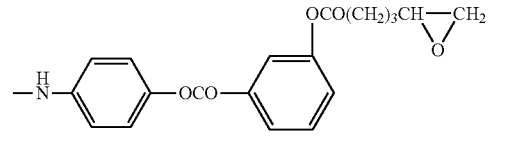
(T-39) 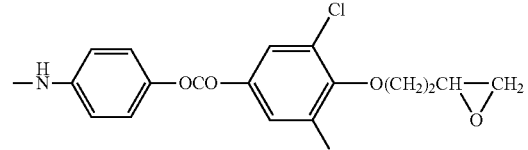
(T-40) 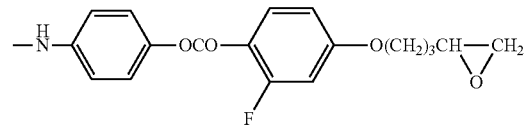

-continued

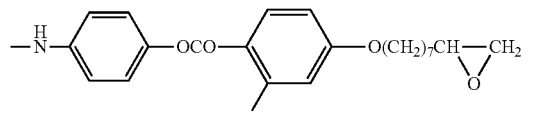 (T-41)

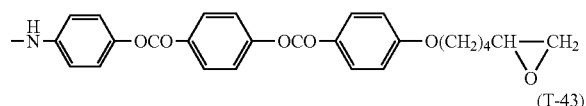 (T-42)

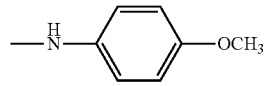 (T-43)

 (T-44)

—Cl

 (T-45)

—OH

 (T-46)

—OCH$_3$ (T-47)

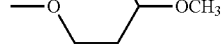 (T-48)

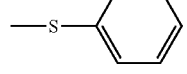 (T-49)

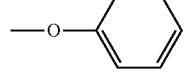 (T-50)

It is preferable that the composition for forming the first optical anisotropic layer used in the present invention contains at least one type of the compound denoted by General Formulas (I) to (III) described above, and the composition for forming the first optical anisotropic layer is a liquid crystal composition which is able to be transitioned to the smectic phase in a temperature range of preferably 80° C. to 180° C., and more preferably 70° C. to 150° C.

In the composition for forming the first optical anisotropic layer used in the present invention, only one type of liquid crystal compound may be contained, or two or more types thereof may be contained. In addition, other liquid crystal compounds may be contained in the composition for forming the first optical anisotropic layer, within a range not departing from the gist of the present invention. For example, a rod-like liquid crystal compound selected from azomethines, azoxys, cyano biphenyls, cyano phenyl esters, benzoic acid esters, cyclohexane carboxylic acid phenyl esters, cyano phenyl cyclohexanes, cyano substituted phenyl pyrimidines, alkoxy substituted phenyl pyrimidines, phenyl dioxanes, tolans, and alkenyl cyclohexyl benzonitriles may be contained in the composition for forming the first optical anisotropic layer.

The amount of liquid crystal compound in the composition for forming the first optical anisotropic layer is preferably 50 mass % to 98 mass %, and is more preferably 70 mass % to 95 mass %, with respect to the total solid content.

Further, the composition for forming the first optical anisotropic layer used in the present invention may include a photopolymerization initiator. The photopolymerization initiator is preferably blended with the composition for forming the first optical anisotropic layer when the liquid crystal compound includes a polymerizable group or when the liquid crystal compound includes a polymerizable compound. Specific examples of the photopolymerization initiator include an α-carbonyl compound (disclosed in the specification of U.S. Pat. No. 2,367,661A and U.S. Pat. No. 2,367,670A), acyloin ether (disclosed in the specification of U.S. Pat. No. 2,448,828A), an α-hydrocarbon substituted aromatic acyloin compound (disclosed in the specification of U.S. Pat. No. 2,722,512A), a polynuclear quinone compound (disclosed in each specification of U.S. Pat. No. 3,046,127A and U.S. Pat. No. 2,951,758A), a combination of a triaryl imidazole dimer and p-aminophenyl ketone (disclosed in the specification of U.S. Pat. No. 3,549,367A), acridine and a phenazine compound (disclosed in the specification of JP1985-105667A (JP-S60-105667A) and U.S. Pat. No. 4,239,850A), oxadiazole compound (disclosed in the specification of U.S. Pat. No. 4,212,970A), and an acyl phosphine oxide compound (disclosed in JP1988-40799B (JP-S63-40799B), JP1993-29234B (JP-1405-29234B), JP1998-95788A (JP-11110-95788A), and JP1998-29997A (JP-H10-29997A)), and the contents thereof are incorporated herein.

The used amount of the photopolymerization initiator is preferably 0.01 mass % to 20 mass %, and is preferably 0.5 mass % to 5 mass %, with respect to the solid content of the composition for forming the first optical anisotropic layer.

The composition for forming the first optical anisotropic layer used in the present invention may contain a polymerizable compound.

The polymerizable compound used along with the liquid crystal compound is not particularly limited insofar as the polymerizable compound has compatibility with respect to the liquid crystal compound, and does not considerably cause a change in an inclination angle of the liquid crystal compound or hindrance to the alignment. Among them, a compound having a polymerization-active ethylenically unsaturated group, for example, a vinyl group, a vinyl oxy group, an acryloyl group, a methacryloyl group, and the like is preferably used.

It is preferable that a polymerizable compound having two or more reactive functional groups is used, since an effect of increasing adhesiveness between the alignment film and the optical anisotropic layer is able to be expected. The polymerizable compound may be a polymer, and it is preferable that the polymerizable compound is a monomer (for example, a molecular weight of less than or equal to 2000).

Only one type of polymerizable compound may be contained in the composition for forming the first optical anisotropic layer or two or more types thereof may be contained in the composition for forming the first optical anisotropic layer. The content of the polymerizable compound is generally in a range of 0.5 mass % to 50 mass %, and is preferably in a range of 1 mass % to 30 mass %, with respect to the liquid crystal compound.

The composition for forming the first optical anisotropic layer may contain a solvent. An organic solvent is preferably used as the solvent of the composition. Examples of the organic solvent include amide (for example, N,N-dimethyl formamide), sulfoxide (for example, dimethyl sulfoxide), a heterocyclic compound (for example, pyridine), hydrocarbon (for example, benzene and hexane), alkyl halide (for example, chloroform and dichloromethane), ester (for example, methyl acetate and butyl acetate), ketone (for example, acetone, methyl ethyl ketone, and cyclohexanone), and ether (for example, tetrahydrofuran and 1,2-dimethoxy ethane). The alkyl halide and the ketone are preferable. Only one type of solvent may be used, or two or more type of organic solvents may be used together. It is preferable that the amount of solvent is adjusted such that the concentration of solid contents of the composition is 10 mass % to 50 mass %.

In addition, the details of the manufacturing method of the first optical anisotropic layer are able to refer to a manufacturing method disclosed in JP2008-225281A or JP2008-026730A.

<<Manufacturing Method of Second Optical Anisotropic Layer>>

Next, a manufacturing method of the second optical anisotropic layer of the present invention will be described in detail. The second optical anisotropic layer is able to be formed by applying the composition for forming the second optical anisotropic layer onto the surface of the first optical anisotropic layer. As described above, even when the composition for forming the second optical anisotropic layer is applied onto the surface of the first optical anisotropic layer by a method of the related art, it is not possible to substantially manufacture the second optical anisotropic layer satisfying a predetermined order parameter. In the present invention, as described above, the second optical anisotropic layer is successfully formed on the surface of the first optical anisotropic layer by a method in which the leveling agent is blended with the first optical anisotropic layer, and thus the surface of the first optical anisotropic layer is flattened, a method in which the vertical aligning agent is blended with the second optical anisotropic layer, and thus the alignment is controlled, by a method in which the compound having a hydroxyl group in the lateral direction is blended with the first optical anisotropic layer, or by a combined method thereof. The manufacturing method of the second optical anisotropic layer is able to refer to the manufacturing method of the first optical anisotropic layer except for directly applying the composition for forming the second optical anisotropic layer onto the surface of the first optical anisotropic layer and for composing the composition of the composition for forming the second optical anisotropic layer.

The composition for forming the second optical anisotropic layer essentially contains the liquid crystal compound, and as necessary, a polymerization initiator, a leveling agent, a polymerizable compound, a solvent, and the like are blended with the liquid crystal compound. Further, as described above, it is preferable that the vertical aligning agent is blended with the liquid crystal compound.

The liquid crystal compound for forming the second optical anisotropic layer may be a rod-like liquid crystal compound, or may be a disk-like liquid crystal compound, and the rod-like liquid crystal compound is more preferable.

The liquid crystal compound for forming the second optical anisotropic layer is preferably a liquid crystal compound exhibiting a liquid crystal state of the smectic phase or the nematic phase, and is more preferably a liquid crystal compound exhibiting a liquid crystal state of the nematic phase.

The same liquid crystal compounds as those described in the section of Composition for Forming First Optical Anisotropic Layer are preferably used as the liquid crystal compound exhibiting a liquid crystal state of the smectic phase.

A compound denoted by General Formula (I) disclosed in JP2008-297210A (in particular, a compound disclosed in paragraphs 0034 to 0039), a compound denoted by General Formula (I) disclosed in JP2010-84032A (in particular, a compound disclosed in paragraphs 0067 to 0073), and the like are able to be used as a compound exhibiting a nematic phase.

In the present invention, it is particularly preferable that the compound exhibiting a nematic phase is at least one type of compound selected from a group consisting of a compound denoted by General Formula (IA) described below and a compound denoted by General Formula (IIA) described below.

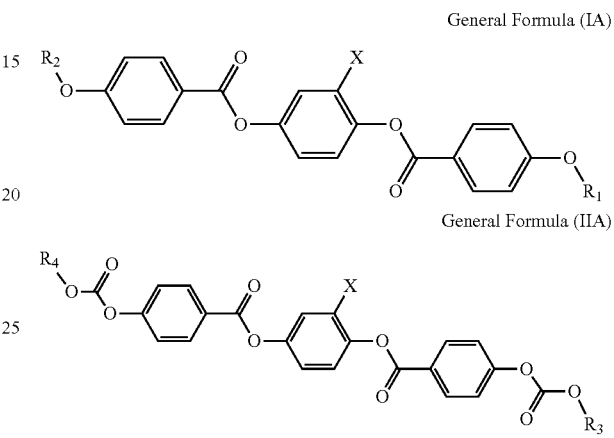

General Formula (IA)

General Formula (IIA)

(In the formula, $R_1$ to $R_4$ each independently represent —$(CH_2)_n$—OOC—CH=$CH_2$, and n represents an integer of 1 to 5. X and Y each independently represent a hydrogen atom or a methyl group.)

In General Formula (IA) or (IIA), it is preferable that X and Y represent a methyl group from a viewpoint of suppressing crystal eduction. From a viewpoint of exhibiting properties as the liquid crystal, n preferably represents an integer of 1 to 5, and more represents an integer of 2 to 5.

In the composition for forming the second optical anisotropic layer used in the present invention, only one type of liquid crystal compound may be contained, or two or more types thereof may be contained. In addition, other liquid crystal compounds may be contained in the composition for forming the second optical anisotropic layer, within a range not departing from the gist of the present invention. For example, a rod-like liquid crystal compound selected from azomethines, azoxys, cyano biphenyls, cyano phenyl esters, benzoic acid esters, cyclohexane carboxylic acid phenyl esters, cyano phenyl cyclohexanes, cyano substituted phenyl pyrimidines, alkoxy substituted phenyl pyrimidines, phenyl dioxanes, tolans, and alkenyl cyclohexyl benzonitriles may be contained in the composition for forming the second optical anisotropic layer.

The amount of liquid crystal compound in the composition for forming the second optical anisotropic layer is preferably 50 mass % to 98 mass %, and is more preferably 70 mass % to 95 mass %, with respect to the total solid content.

Further, the composition for forming the second optical anisotropic layer may include a polymerization initiator, a leveling agent, a polymerizable compound, a solvent, and the like. The details thereof are able to refer to those described in the section of Composition for Forming First Optical Anisotropic Layer, and the same preferred range or the same blended amount of the composition for forming the first optical anisotropic layer apply to those of the composition for forming the second optical anisotropic layer.

<Phase Difference Film>

The phase difference film of the present invention may be formed only of the first optical anisotropic layer and the second optical anisotropic layer, or may include the supporter, the alignment film used for forming the first optical anisotropic layer, and the like.

The supporter is not particularly limited. Various polymer films are able to be used as the supporter. An example includes a transparent polymer film having low optical anisotropy, but the present invention is not limited thereto. Here, a transparent supporter indicates that transmittance is greater than or equal to 80%. In addition, low optical anisotropy indicates that in-plane retardation (Re(550)), for example, is less than or equal to 20 nm, and is preferably less than or equal to 10 nm. The transparent supporter may be wound into the shape of a long roll, or may be, for example, in the shape of a rectangular sheet which is the size of a final product. It is preferable that the alignment film and the optical anisotropic layer are continuously formed by using the polymer film which is wound into the shape of a long roll as the supporter, and are cut to have a necessary size.

Examples of the polymer film which is able to be used as the supporter include films of cellulose acylate, polycarbonate, polysulfone, polyether sulfone, polyacrylate and polymethacrylate, a cyclic polyolefin, and the like. A cellulose acylate film is preferable, and a cellulose acetate film is more preferable. When the cellulose acylate film is used, a decrease in the front contrast is further suppressed.

In addition, when an aspect is configured in which the supporter described below and a polarizer are combined, polyvinyl alcohol may be used as a polymer.

In the phase difference film of the present invention, the total thickness of the first optical anisotropic layer and the second optical anisotropic layer is preferably 0.6 μm to 6 μm, is more preferably 1.0 μm to 5.0 μm, and is even more preferably 1.5 μm to 3.0 μm. According to such a range, thinning is able to be further realized.

Figure 2:
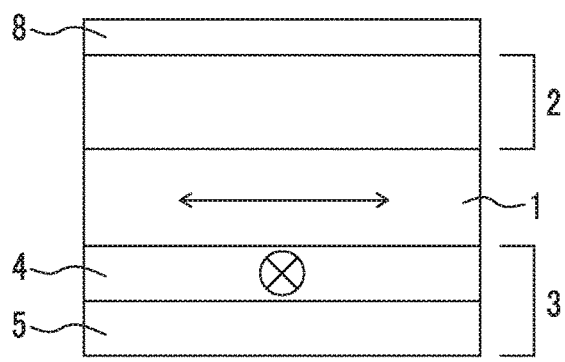
FIG. 2 is a schematic view illustrating another example of the configuration of the phase difference film of the present invention.
Figure 3:
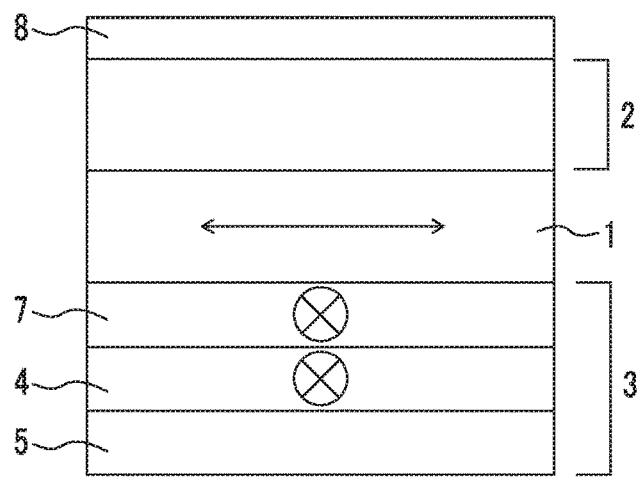
FIG. 3 is a schematic view illustrating another example of the configuration of the phase difference film of the present invention.

In addition, the total thickness of the phase difference film of the present invention (when a protective film of the polarization plate is combined, the total thickness from a layer adjacent to the polarizing film to the second optical anisotropic layer, for example, the thickness of three portions of FIGS. 1 to 3) is preferably less than or equal to 40 μm, is more preferably less than or equal to 35 μm, is even more preferably less than or equal to 10 μm, and is particularly preferably less than or equal to 3 μm. In the present invention, in particular, it is possible to form the phase difference film without using the supporter and the alignment film, and thus it is possible to decrease the total thickness of the phase difference film to be less than or equal to 3 μm. The lower limit value is greater than or equal to 0.6 μm, and is preferably greater than or equal to 1 μm.

The phase difference film of the present invention is preferably used as the protective film of the polarization plate. In addition, the phase difference film of the present invention may be incorporated as the phase difference film separately from the polarization plate, and in this case, it is more preferable that the phase difference film is arranged between a front-side polarizing film and a liquid crystal cell. In addition, the phase difference film may be arranged between a rear-side polarizing film and the liquid crystal cell. The front side in the present invention indicates a visible side of the liquid crystal display device.

<Polarization Plate>

The polarization plate of the present invention includes the polarizing film and the phase difference film of the present invention, and may further include a protective film on the surface of the polarizing film on a side on which the phase difference film of the present invention is not disposed. The polarization plate of the present invention is preferably used as the protective film on the front side of the polarization plate. Further, it is more preferable that the phase difference film of the present invention is arranged on a side close to the liquid crystal cell, and the phase difference film of the present invention is arranged between the front-side polarizing film and the liquid crystal cell at the time of being incorporated in the liquid crystal display device.

Examples of the polarizing film include an iodine-based polarizing film, a dye-based polarizing film using a dichromatic dye, or a polyene-based polarizing film. In general, the iodine-based polarizing film and the dye-based polarizing film are able to be manufactured by using a polyvinyl alcohol film.

In general, the protective film on the side of the polarizing film on which the phase difference film of the present invention is not disposed is a polymer film. A cellulose acylate film is exemplified as the protective film.

The surface of the protective film and the phase difference film used in the present invention, that is, the surface on a side onto which the polarizing film is bonded is subjected to a saponification treatment which hydrophilizes the surface, and thus it is possible to enhance adhesiveness with respect to the polarizing film containing polyvinyl alcohol as a main component. Furthermore, when the phase difference film of the present invention is directly disposed on the surface of the polarizing film, the saponification treatment is able to be omitted.

Hereinafter, a preferred aspect of the polarization plate of the present invention will be described with reference to the drawings. It is obvious that the configuration of the polarization plate of the present invention is not limited thereto. In addition, the following scale of the drawings may not be coincident with the actual scale of the polarization plate.

FIG. 1 to FIG. 3 are examples illustrating the configuration of the polarization plate of the present invention, "1" indicates the polarizing film, "2" indicates the protective film of the polarizing film, "3" indicates the phase difference film of the present invention, "4" indicates the first optical anisotropic layer, "5" indicates the second optical anisotropic layer, "6" indicates the supporter of the phase difference film, and "7" indicates the alignment film, respectively. An arrow in the polarizing film 1 of FIG. 1 indicates a direction of a polarization axis, and a symbol in the first optical anisotropic layer 4 indicates a direction of a slow axis which is orthogonal to the arrow of the polarizing film 1. An arrow of the alignment film 7 indicates a rubbing direction of the alignment film. The same is able to apply to the following drawings.

FIG. 1 is an aspect of bonding the protective film 2 onto one surface of the polarizing film 1 and of bonding the phase difference film 3 of the present invention onto the other surface. The bonding is able to be performed by using a pressure-sensitive adhesive agent or an adhesive agent, and a paste (an adhesive layer or the like is not illustrated).

In FIG. 1, in the phase difference film 3, the alignment film 7 is formed on the surface of the supporter 6, and the first optical anisotropic layer 4 and the second optical anisotropic layer 5 are disposed on the surface of the alignment film 7. It is preferable that the alignment film 7 is disposed such that the rubbing direction of the alignment film 7 is orthogonal to a longitudinal direction of the polarizing film.

FIG. 2 is an aspect in which the protective film 2 is disposed on one surface of the polarizing film 1, and the first optical anisotropic layer 4 and the second optical anisotropic layer 5 are directly disposed on the other surface in this order. In FIG. 2, the phase difference film 3 of the present invention is formed only of the first optical anisotropic layer 4 and the second optical anisotropic layer 5, and thus it is possible to make the thickness of the phase difference film extremely thin.

In a case of the aspect of FIG. 2, it is preferable that the surface of the polarizing film 1 is subjected to a rubbing treatment, and then the first optical anisotropic layer is disposed on the surface. In addition, in FIG. 2, a hard coat layer 8 is disposed on the surface of the protective film 2.

It is preferable that the hard coat layer is a layer formed by curing a polymerizable compound. Specifically, a layer formed by applying and curing a composition including multifunctional (meth)acrylate, a polymerization initiator, and a solvent is exemplified. It is preferable that the thickness of the hard coat layer is approximately 1 μm to 10 μm. By disposing such a hard coat layer, even when the protective film or the like is thin, it is possible to prevent the protective film from being impaired. Further, it is possible to make the polarization plate thinner by directly disposing the hard coat layer on the polarizing film without using the protective film 2, insofar as a problem of manufacturing aptitude or the like does not occur.

FIG. 3 is an aspect in which the protective film 2 is formed on one surface of the polarizing film 1, the alignment film 7 is formed on the other surface, the first optical anisotropic layer 4 and the second optical anisotropic layer 5 are disposed on the surface of the alignment film 7, and thus the phase difference film 3 is formed. It is preferable that the alignment film 7 is disposed such that the rubbing direction of the alignment film 7 is orthogonal to the longitudinal direction of the polarizing film. Further, in FIG. 3, the hard coat layer 8 is disposed on the surface of the protective film.

<Liquid Crystal Display Device>

The present invention relates to the phase difference film of the present invention or the liquid crystal display device including the polarization plate. The driving mode of the liquid crystal display device is not particularly limited, but a Twisted Nematic (TN) type liquid crystal display device, an Optically Compensated Bend (OCB) type liquid crystal display device, a Vertical Alignment (VA) type liquid crystal display device, and the like are able to be used, and in particular, a horizontal electric field type liquid crystal display device represented by an In-Plane Switching (IPS) type liquid crystal display device, a Fringe Field Switching (FFS) type liquid crystal display device, a Plane to Line Switching (PLS) type liquid crystal display device, and the like (hereinafter, may be represented by an IPS mode) is able to be preferably used. In addition, in the present invention, the liquid crystal display device may be any one of a transmissive type liquid crystal display device, a reflective type liquid crystal display device, and a semitransmissive type liquid crystal display device.

For example, liquid crystal display devices disclosed in each publication of JP2003-15160A, JP2003-75850A, JP2003-295171A, JP2004-12730A, JP2004-12731A, JP2005-106967A, JP2005-134914A, JP2005-241923A, JP2005-284304A, JP2006-189758A, JP2006-194918A, JP2006-220680A, JP2007-140353A, JP2007-178904A, JP2007-293290A, JP2007-328350A, JP2008-3251A, JP2008-39806A, JP2008-40291A, JP2008-65196A, JP2008-76849A, JP2008-96815A, and the like are able to be used as the IPS type (hereinafter, also referred to as an IPS mode) liquid crystal display device.

The FFS type (hereinafter, also referred to as a FFS mode) liquid crystal display device includes a counter electrode and a pixel electrode. The electrodes are formed of a transparent substance such as ITO, and are formed to have width to the extent of driving all of liquid crystal molecules and the like arranged on the upper portion of the electrode at an interval which is narrower than an interval between an upper substrate and a lower substrate. A FFS type liquid crystal cell, for example, is able to refer to liquid crystal cells disclosed in each publication of JP2001-100183A, JP2002-14374A, JP2002-182230A, JP2003-131248A, JP2003-233083A, and the like.

Figure 4:
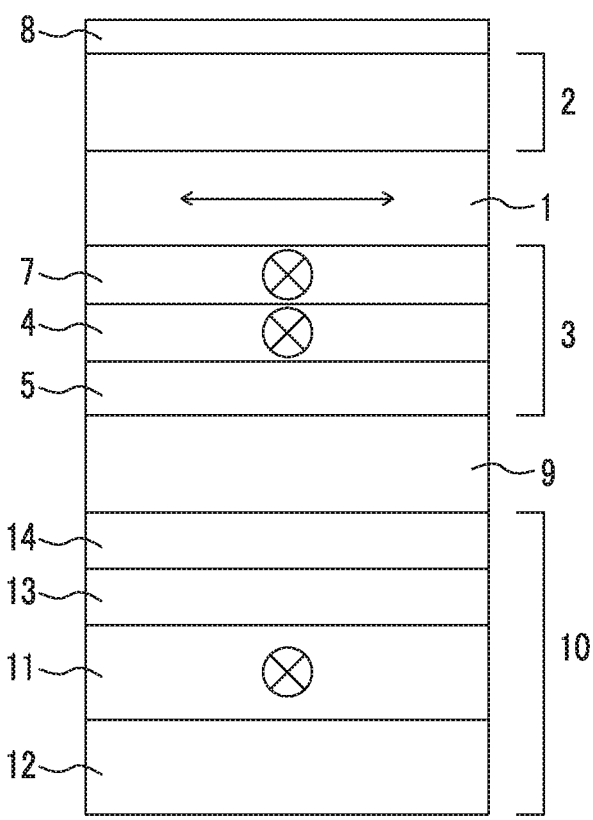
FIG. 4 is a schematic view illustrating an example of a configuration of a liquid crystal display device of the present invention.

FIG. 4 illustrates an example of the configuration of the liquid crystal display device of the present invention. In FIG. 4, "1" to "8" are common with those of FIGS. 1 to 3, and the details are able to refer to the description of FIG. 3. In addition, in FIG. 4, "9" indicates the liquid crystal cell, "10" indicates the rear-side polarization plate, "11" indicates the rear-side polarizing film, "12" indicates the protective film of the rear-side polarizing film, "13" indicates the alignment film, and "14" indicates the optical anisotropic layer. Absorption axes of the front-side polarizing film 1 and the rear-side polarization plate 11 are orthogonal to each other. Further, in the liquid crystal display device illustrated in FIG. 4, the optical anisotropic layer 14 is disposed between the rear-side polarizing film 11 and the liquid crystal cell 9. The optical anisotropic layer 14, for example, is able to be formed by disposing the alignment film 13 on the surface of the polarizing film 11, by applying a composition for forming the optical anisotropic layer onto the surface of the alignment film 13, and by curing the composition. In the embodiment of FIG. 4, in the optical anisotropic layer 14 (the optical film), it is preferable that in-plane retardation (Re(550)) at a wavelength of 550 nm is 30 μm to 120 nm, and retardation (Rth(550)) in a thickness direction at a wavelength of 550 nm is 20 nm to 100 nm. Further, it is preferable that the optical anisotropic layer 14 is an optical anisotropic layer in which the liquid crystal compound is tilt-aligned. In this case, it is preferable that the angle of the tilt alignment is −1.5° to 3° which is the same tilt angle as a pretilt angle of a driving liquid crystal in the liquid crystal cell in the same tilt direction as that of the pretilt angle. It is preferable that the liquid crystal compound is a rod-like liquid crystal compound. Only one type of rod-like liquid crystal compound may be used, or two or more types thereof may be used. It is preferable that the liquid crystal compound is used by controlling the degree of alignment order such that the degree of alignment order is high, as in the liquid crystal compound of the present invention.

The polarizing film is compensated by disposing the optical anisotropic layer 14 on the rear side, and thus birefringence component of each member other than the optical anisotropic layer of the liquid crystal display device is compensated, and it is possible to provide a liquid crystal display device having more excellent tint and more excellent vertical symmetry.

Herein, Re(λ) and Rth(λ) each represent the in-plane retardation and the retardation in the thickness direction at a wavelength of λ. Re(λ) is measured by allowing light having a wavelength λ to be incident on a film in a film normal direction using KOBRA 21ADH or WR (manufactured by Oji Scientific Instruments). The measurement is able to be performed by manually replacing a wavelength selection filter or by converting a measured value with a program or the like at the time of selecting a measurement wavelength of λ nm. When the film to be measured is denoted by a monoaxial index ellipsoid or a biaxial index ellipsoid, Rth (λ) is calculated by the following method.

In Rth(λ), Re(λ) described above is measured at total 6 points by allowing the light having a wavelength of λ nm to be incident on the film from directions respectively inclined in 10° step from a normal direction to 50° on one side with respect to the film normal direction in which an in-plane slow axis (determined by KOBRA 21ADH or WR) is used as an inclination axis (a rotational axis) (when there is no slow axis, an arbitrary direction of a film plane is used as the rotational axis), and Rth(λ) is calculated by KOBRA 21ADH or WR on the basis of the measured retardation value, an assumed value of the average refractive index, and the input film thickness value. In the above description, in a case of a film having a direction in which a retardation value at a certain inclination angle is zero by using the in-plane slow axis as the rotational axis from the normal direction, a retardation value at an inclination angle greater than the inclination angle described above is changed to have a negative sign, and then Rth(λ) is calculated by KOBRA 21ADH or WR. Furthermore, a retardation value is measured from two arbitrarily inclined directions by using the slow axis as the inclination axis (the rotational axis) (when there is no slow axis, an arbitrary direction of the film plane is used as the rotational axis), and Re and Rth are able to be calculated by Expression (A) described below and Expression (III) described below on the basis of the retardation value, an assumed value of the average refractive index, and the input film thickness value.

$$Re(\theta) = \left[ nx - \frac{(ny \times nz)}{\sqrt{\left\{ ny \sin\left(\sin^{-1}\left(\frac{\sin(-\theta)}{nx}\right)\right)\right\}^2 + \left\{ nz \cos\left(\sin^{-1}\left(\frac{\sin(-\theta)}{nx}\right)\right)\right\}^2}} \right] \times \frac{d}{\cos\left(\sin^{-1}\left(\frac{\sin(-\theta)}{nx}\right)\right)}$$

Expression (A)

Furthermore, Re(θ) described above indicates a retardation value in a direction inclined by an angle of θ from the normal direction. In addition, in Expression (A), nx represents a refractive index in the slow axis direction in the plane, ny represents a refractive index in a direction orthogonal to nx in the plane, and nz represents a refractive index in a direction orthogonal to nx and ny.

$$Rth=((nx+ny)/2-nz) \times d$$ Expression (III)

When the film to be measured is a so-called film not having an optic axis which is not able to be denoted by a monoaxial index ellipsoid or a biaxial index ellipsoid, Rth (λ) is calculated by the following method. In Rth(λ), Re(λ) described above is measured at 11 points by allowing the light having a wavelength of λ nm to be incident on the film from directions respectively inclined in 10° step from −50° to +50° with respect to the film normal direction in which the in-plane slow axis (determined by KOBRA 21ADH or WR) is used as the inclination axis (the rotational axis), and Rth(λ) is calculated by KOBRA 21ADH or WR on the basis of the measured retardation value, an assumed value of the average refractive index, and the input film thickness value.

In addition, in the measurement described above, a catalog value of various films in a polymer handbook (JOHN WILEY&SONS, INC) is able to be used as the assumed value of the average refractive index. When the value of the average refractive index is not known in advance, the value of the average refractive index is able to be measured by using an Abbe's refractometer. The value of the average refractive index of a phase difference film will be exemplified as follows: cellulose acylate (1.48), a cycloolefin polymer (1.52), polycarbonate (1.59), polymethyl methacrylate (1.49), and polystyrene (1.59). The assumed values of the average refractive index and the film thickness are input, and thus nx, ny, and nz are calculated by KOBRA 21ADH or WR. Nz=(nx−nz)/(nx−ny) is further calculated by the calculated nx, ny, and nz.

The measurement wavelength of Re and Rth is a value at 7 of 550 nm in a visible light region unless otherwise specified.

EXAMPLES

Hereinafter, the present invention will be more specifically described with reference to examples. Materials, used amounts, ratios, treatment contents, treatment sequences, and the like of the following examples are able to be suitably changed unless the changes cause deviance from the gist of the present invention. Accordingly, the range of the present invention will not be limited to the following specific examples.

(1) Preparation of Liquid Crystal Display Device of Layer Configuration a (Liquid Crystal Display Device Including Polarization Plate of FIG. 1)

<Alkali Saponification Treatment>

One surface of a cellulose film (manufactured by Fujifilm Corporation, zero retardation TAC, ZRF25, and thickness: 25 μm) was subjected to the following alkali saponification treatment.

The film (ZRF25) passed over a dielectric heating roll at a temperature of 60° C., the temperature of the film surface was heated to 40° C., and then an alkali solution (S-1) having the following composition was applied to the film in the coating amount of 17 mL/m² by using a rod coater, and the film was retained under a steam type far infrared heater manufactured by Noritake Co., Ltd. which was heated to 110° C. for 10 seconds. Subsequently, distilled water was applied to the film in the coating amount of 2.8 mL/m² by using the same rod coater, and then water washing with a fountain coater and draining with an air knife were repeated three times, the film was retained in a drying zone at 70° C. for 5 seconds and was dried, and thus a film A-1 of which one surface was subjected to a saponification treatment was prepared.

<<Composition of Alkali Solution (S-1)>>
Potassium Hydroxide 8.6 parts by mass
Water 24.1 parts by mass
Isopropanol 56.3 parts by mass
Surfactant (K-1: $C_{16}H_{33}O(CH_2CH_2O)_{10}H$) 1.0 part by mass
Propylene Glycol 10.0 parts by mass
<<Physical Properties of Alkali Solution S-1>>
Surface Tension 20 mN/m
Viscosity 5.2 mPa·s
<Preparation of Alignment Film>

100 parts by mass of a compound (polyvinyl alcohol 1) denoted by polyvinyl alcohol of the following formula and 5 parts by mass of a compound denoted by T1 described below were dissolved in a solvent of water:methanol 75:25 (mass ratio) such that a solution of 4.0 mass % was obtained, and thus a composition for preparing a polyvinyl alcohol layer was prepared. After that, the solution was applied onto the surface of the film which had been subjected to the saponification treatment by using a wire bar coater #8, and was dried at 60° C. for 0.5 minutes. The film thickness of the obtained polyvinyl alcohol layer was 0.25 μm

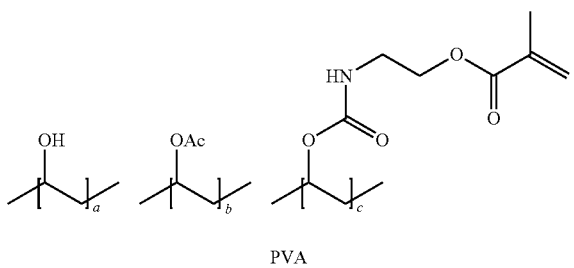

PVA a, b, and c represent a molar ratio of each unit.

The polyvinyl alcohol 1 is polyvinyl alcohol in which a is 96, b is 2, and c is 2 in the polyvinyl alcohol described above. Ac represents an acetyl group.

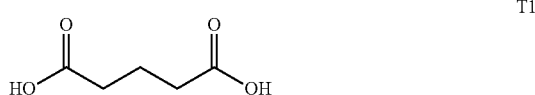

T1

The surface of the obtained polyvinyl alcohol layer was subjected to a rubbing treatment in a direction orthogonal to a longitudinal direction of the film (ZRF25), and thus a polyvinyl alcohol alignment film was prepared.

<Preparation of First Optical Anisotropic Layer>

The following composition was dissolved in a solution of methyl ethyl ketone:cyclohexanone=86:14 (mass ratio), and the amount of the composition was adjusted to be 30 mass %.

Liquid Crystal Compound Shown in a table Described below (any one of α to ε) 100 parts by mass

| | |
|---|---|
| Polymerization Initiator J1 | 3 parts by mass |
| Polymerization Initiator J2 | 1 part by mass |
| Leveling Agent R1 | 0.8 parts by mass |
| Leveling Agent R2 | 0.05 parts by mass |
| Acrylate Monomer A1 | 5 parts by mass |

<<Liquid Crystal α>>

| Compound B03 Described below | 80 parts by mass |
|---|---|

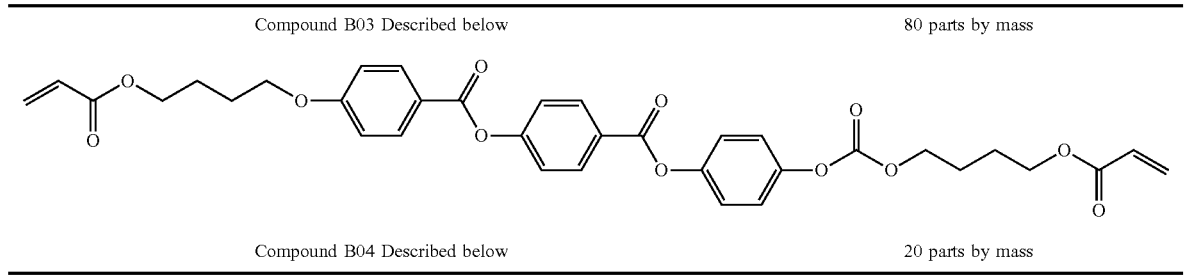

| Compound B04 Described below | 20 parts by mass |
|---|---|

An NI point of the liquid crystal α was 145° C., and the liquid crystal α exhibited a nematic phase.

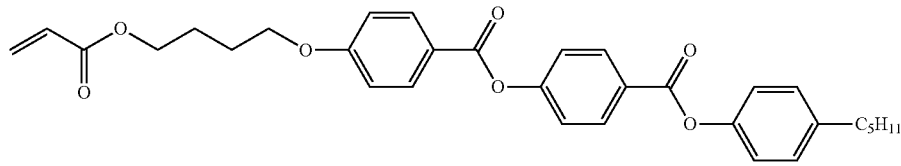

<<Liquid Crystal β>>

| Compound B01 | 80 parts by mass |
| Compound B02 | 20 parts by mass |

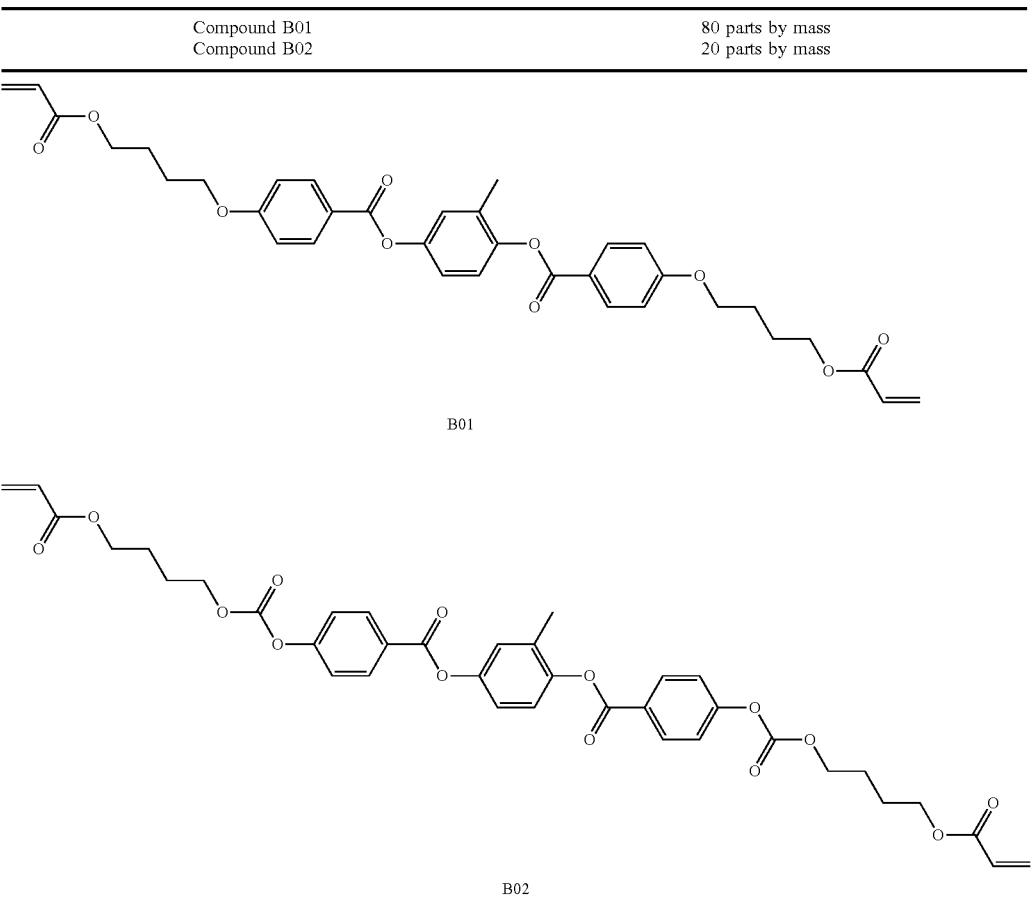

An NI point of the liquid crystal β was 120° C., and the liquid crystal β exhibited a nematic phase.

<<Liquid Crystal γ>>

| Compound B03 | 60 parts by mass |
| Compound B04 | 20 parts by mass |
| Compound B02 | 20 parts by mass |

An NI point of the liquid crystal γ was 142° C., and the liquid crystal γ exhibited a nematic phase.

<<Liquid Crystal ε>>

Compound A Disclosed in Paragraphs 0161 of JP2010-84032A

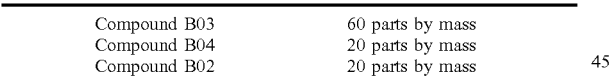

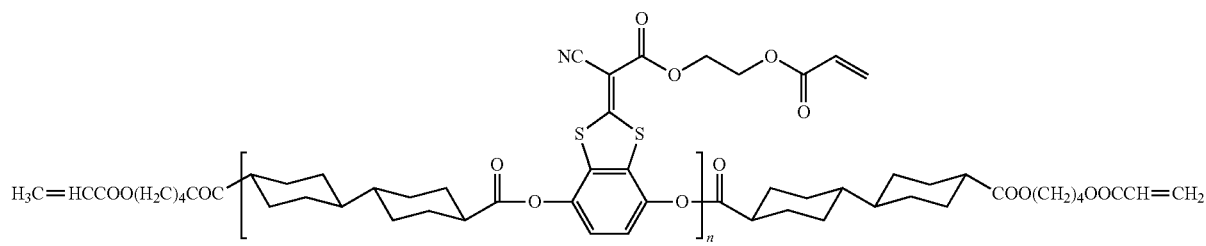

Cry 100° C. N250° C. or higher Iso

Polymerization Initiator J1

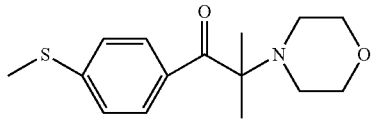 [SMILES: CSc1ccc(C(=O)C(C)(C)N2CCOCC2)cc1]

Polymerization Initiator J2

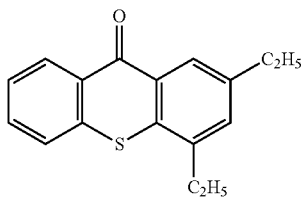

Leveling Agent R1

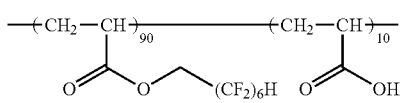

Leveling Agent R2

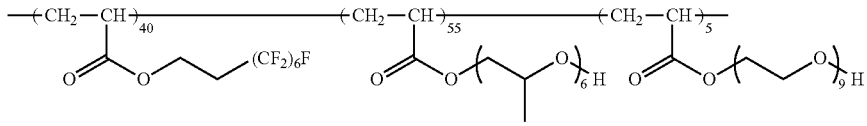

Acrylate Monomer A1

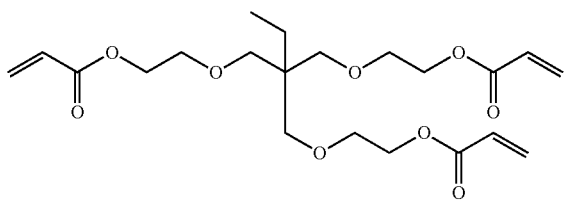 [SMILES: C=CC(=O)OCCOCC(CC)(COCCOC(=O)C=C)COCCOC(=O)C=C]

The composition described above was applied onto a film by using a wire bar coater which was selected according to the film thickness and was dried at 70° C. for 2 minutes, and a rod-like liquid crystal compound was aligned (homogeneous alignment). The film was cooled to 40° C., and then a coating layer was cured by being irradiated with an ultraviolet ray having illuminance of 190 mW/cm2 and irradiation dose of 150 mJ/cm$^2$ at an oxygen concentration of approximately 0.1% under nitrogen purge, by using an air cooling metal halide lamp (manufactured by Eye Graphics Co., Ltd.) of 160 W/cm. After that, the layer was cooled to room temperature. The film thickness of the obtained optical anisotropic layer was shown in the table.

In a polarization microscope, when an alignment axis direction matched a polarizer absorption axis (0° and 90°) in a crossed nicol state, quenching was performed, a change in luminance was observed at the angle between the alignment axis direction and the polarizer absorption axis, and the luminance was maximized in a direction of 45°, and thus the homogeneous alignment was confirmed.

<Preparation of Second Optical Anisotropic Layer>

The following composition was dissolved in a solution of methyl ethyl ketone:cyclohexanone=86:14 (mass ratio), and the amount of composition was adjusted to be 30 mass %.

Liquid Crystal Compound B01+Liquid Crystal Compound B02 100 parts by mass (Composition of 80:20 (mass ratio))
Polymerization Initiator J1 3 parts by mass
Polymerization Initiator J2 1 part by mass
Leveling Agent R1 0.4 parts by mass
Leveling Agent R2 0.05 parts by mass
Acrylate Monomer A1 5parts by mass
Vertical Aligning Agent S1 1 part by mass
Vertical Aligning Agent S2 0.5 parts by mass
(However, in Comparative Example 5, the blended amount of the acrylate monomer A1 was changed to 15 parts by mass from 5 parts by mass.)
Vertical Aligning Agent S1

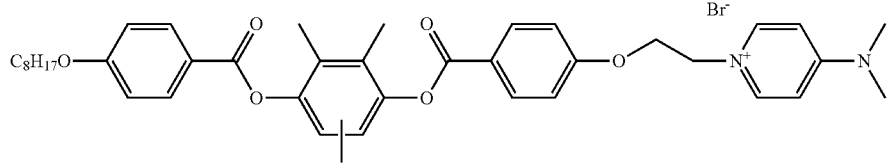

Vertical Aligning Agent S2

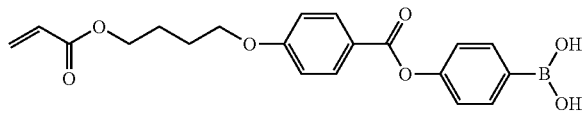 [SMILES: C=CC(=O)OCCCCOc1ccc(C(=O)Oc2ccc(B(O)O)cc2)cc1]

The obtained composition was applied onto a film by using a wire bar coater which was selected according to the film thickness and was heated in a thermostatic bath at 100° C. for 2 minutes, and a rod-like liquid crystal compound was aligned (home alignment). Next, the film was cooled to 40° C., and then a coating layer was cured by being irradiated with an ultraviolet ray having illuminance of 190 mW/cm2 and irradiation dose of 300 mJ/cm$^2$ at an oxygen concentration of approximately 0.1% under nitrogen purge, by using an air cooling metal halide lamp (manufactured by Eye Graphics Co., Ltd.) of 160 W/cm. After that, the layer was cooled to room temperature.

Thus, the polyvinyl alcohol alignment film was prepared on the film (ZRF25), the first optical anisotropic layer having homogeneous alignment was prepared, and the second optical anisotropic layer having homeotropic alignment was further prepared on the first optical anisotropic layer.

A surface of a laminated body obtained as described above on a side opposite to the second optical anisotropic layer side was bonded to the polyvinyl alcohol polarizing film (a thickness of 17 μm) by using a polyvinyl alcohol paste. At this time, the polarizing film was bonded to the surface of the laminated body such that the rubbing direction was orthogonal to the longitudinal direction of the polarizing film.

Further, a cellulose acylate film A (a protective film, and a film thickness of 25 μm) manufactured by a layer configuration b described below was bonded to a surface of the polarizing film to which the second optical anisotropic layer was not bonded by using an aqueous solution of polyvinyl alcohol of 3% (manufactured by Kurary Co., Ltd., polyvinyl alcohol-117H) as an adhesive agent.

<Preparation of Liquid Crystal Display Device>
<<Preparation of Liquid Crystal Cell>>

A liquid crystal panel was taken out from iPad [product name; manufactured by Apple Inc.] including an IPS type liquid crystal cell, polarization plates arranged on a front side (a display surface side) and a rear side (a backlight side) of a liquid crystal cell were removed, and thus a glass surface of the liquid crystal cell was washed.

<<Preparation of Rear-Side Polarization Plate>>

One surface of zero retardation TAC (manufactured by Fujifilm Corporation, ZRF25) and one surface of Fujitac TD60UL (a thickness of 60 μm) manufactured by Fujifilm Corporation were respectively subjected to the same alkali saponification treatment as described above. A polyvinyl alcohol polarizing film (a thickness of 17 μm) was interposed between these films such that the surface which was subjected to the alkali saponification treatment was on the polyvinyl alcohol polarizing film side, and was bonded thereto by using an aqueous solution of polyvinyl alcohol of 3% (manufactured by Kurary Co., Ltd., polyvinyl alcohol-117R) as an adhesive agent, and thus a rear-side polarization plate was obtained.

The polarization plate of the present invention was bonded onto the front side of the side surface of the display surface of the IPS type liquid crystal cell described above, and the rear-side polarization plate described above was bonded to the other side. At this time, the front side was bonded such that the optical anisotropic layer was close to the liquid crystal cell, and the rear side was bonded such that ZRF25 was close to the liquid crystal cell. Thus, an IPS type liquid crystal display device LCD was prepared. The prepared LCD returned to iPad from which the liquid crystal panel was taken out.

(2) Preparation of Liquid Crystal Display Device of Layer Configuration b (Liquid Crystal Display Device Including Polarization Plate of FIG. 2)

<Preparation of Polarization Plate Protective Film>

The following composition of a cellulose acylate dope for a core layer was put into a mixing tank and was stirred, and each component was dissolved, and thus a cellulose acylate dope for a core layer was prepared.

| | |
|---|---|
| Cellulose Acetate Having Degree of Acetyl Substitution of 2.88 | 100 parts by mass |
| Ester Oligomer 1 | 10 parts by mass |
| Durability Improver 1 | 4 parts by mass |
| Ultraviolet Absorbent 1 | 3 parts by mass |
| Methylene Chloride (First Solvent) | 438 parts by mass |
| Methanol (Second Solvent) | 65 parts by mass |

Ester Oligomer 1

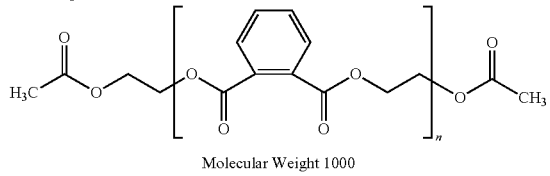

Molecular Weight 1000

Durability Improver 1

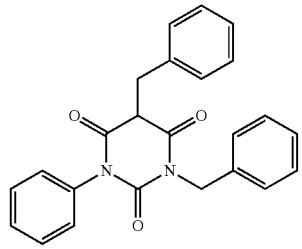 [SMILES: O=C1C(Cc2ccccc2)C(=O)N(c2ccccc2)C(=O)N1Cc1ccccc1]

Ultraviolet Absorbent 1

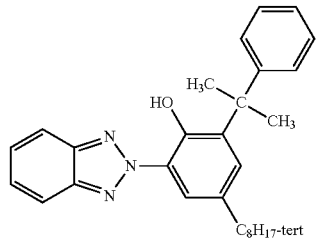

10 parts by mass of the following matting agent solution was added to 90 parts by mass of the cellulose acylate dope for a core layer described above, and thus a cellulose acetate solution for an outer layer was prepared.

| | |
|---|---|
| Silica Particles Having Average Particle Size of 20 nm (AEROSIL R972, manufactured by Nippon Aerosil Co., Ltd.) | 2 parts by mass |
| Methylene Chloride (First Solvent) | 76 parts by mass |
| Methanol (Second Solvent) | 11 parts by mass |
| Cellulose Acylate Dope for Core Layer | 1 part by mass |

The cellulose acylate dope for a core layer described above and a cellulose acylate dope for an outer layer on both sides thereof were concurrently cast onto a drum at 20° C.

in three layers from a casting port. The peeling off was performed in a state where a solvent content ratio was approximately 20 mass %, and both ends of the film in a width direction were fixed by using a tenter clip, and the film was dried while being stretched at a stretching ratio of 1.2 times in a horizontal direction in a state where the amount of residual solvent was 3 mass % to 15 mass %. After that, the film was transported between rolls of a heat treatment device, and thus a cellulose acylate film having a thickness of 25 μm was prepared (a cellulose acylate film A).

<Preparation of Hard Coat Layer>

A hard coat composition 1 described below was applied onto one surface of the cellulose acylate film A described above, and after that, was dried at 100° C. for 60 seconds, and was cured by being irradiated with an ultraviolet ray at 1.5 kW and 300 mJ in conditions of nitrogen of less than or equal to 0.1%, and thus a hard coat layer having a thickness of 5 ini was prepared. Furthermore, the film thickness was adjusted by adjusting the coating amount in a die coating method using a slot die.

<<Hard Coat Composition 1>>

Pentaerythritol Triacrylate/Pentaerythritol Tetraacrylate (a mass ratio of 3:2) total 53.5 parts by mass Photopolymerization Initiator J3 1.5 parts by mass
Ethyl Acetate 100 parts by mass
Photopolymerization initiator J3

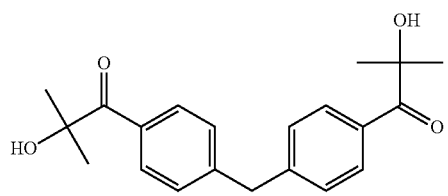 [SMILES: CC(C)(O)C(=O)c1ccc(Cc2ccc(C(=O)C(C)(C)O)cc2)cc1]

<Saponification of Film>

The prepared cellulose acylate film A with hard coat was dipped in 4.5 mol/L of an aqueous solution of sodium hydroxide (a saponification solution) of which the temperature was adjusted to 37° C. for 1 minute, and then the film was washed with water, and after that, the film was dipped in 0.05 mol/L of an aqueous solution of a sulfuric acid for 30 seconds, and then passed through a water washing bath. Then, draining with an air knife was repeated three times, water dripping was performed, and then the film was dried by being retained in a drying zone at 70° C. for 15 seconds, and thus a film which was subjected to a saponification treatment was prepared.

<Preparation of Polarizing Film>

According to Example 1 of JP2001-141926A, a difference in a rotational speed was imparted to two pairs of nip rolls, and stretching was performed in a longitudinal direction, and thus a polarizing film having a width of 1330 mm in the longitudinal direction and a thickness of 15 μm was prepared.

<Bonding>

The polarizing film obtained as described above was bonded to the film described above which was subjected to the saponification treatment on the cellulose acylate film A side of the film opposite to the hard coat layer side by using an aqueous solution of polyvinyl alcohol of 3% (manufactured by Kurary Co., Ltd., polyvinyl alcohol-117H) as an adhesive agent in a roll-to-roll manner such that a polarization axis was orthogonal to the longitudinal direction of the cellulose acylate film, and thus a polarizing film having a protective film on one surface was prepared.

<Rubbing Treatment>

The surface of the polarizing film was subjected to a rubbing treatment in a direction vertical to the polarization axis.

<Preparation of First Optical Anisotropic Layer>

A first optical anisotropic layer was prepared by the same method as that in the layer configuration a described above.

<Preparation of Second Optical Anisotropic Layer>

A second optical anisotropic layer was prepared by the same method as that in the layer configuration a described above.

<Preparation of Liquid Crystal Display Device>

A liquid crystal display device was prepared by the same method as that in the layer configuration a described above (3) Preparation of Liquid Crystal Display Device of Layer Configuration c (Liquid Crystal Display Device Including Polarization Plate of FIG. 3)

<Preparation of Polarizing Film having Protective Film on One Surface>

A polarizing film having a protective film on one surface was prepared by the same method as that in the layer configuration <Preparation of Alignment Film>

100 parts by mass of a compound (polyvinyl alcohol 1) denoted by polyvinyl alcohol of the following formula and 5 parts by mass of a compound denoted by T1 described below were dissolved in a solvent of water:methanol=75:25 (mass ratio) such that a solution of 4.0 mass % was obtained, and thus a composition for preparing a polyvinyl alcohol layer was prepared. After that, the solution was applied onto the polarizing film having a protective film on one surface by using a wire bar coater #8, and was dried at 60° C. for 0.5 minutes. The film thickness of the obtained polyvinyl alcohol layer was 0.25 μm.

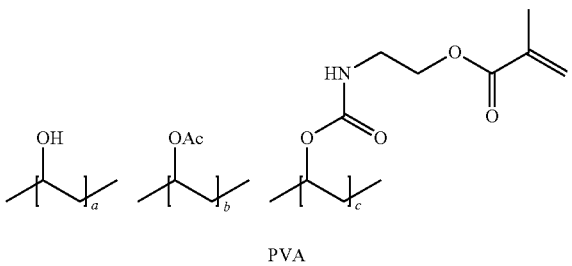

PVA a, b, and c represent a molar ratio of each unit.

The polyvinyl alcohol 1 is polyvinyl alcohol in which a is 96, b is 2, and c is 2 in the polyvinyl alcohol described above.

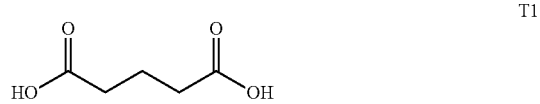

T1

The surface of the polyvinyl alcohol layer was subjected to a rubbing treatment in a direction orthogonal to a longitudinal direction of the film (ZRF25) While transporting the obtained polyvinyl alcohol layer, and thus a polyvinyl alcohol alignment film was prepared.

<Preparation of First Optical Anisotropic Layer>

A first optical anisotropic layer was prepared by the same method as that in the layer configuration a described above.

<Preparation of Second Optical Anisotropic Layer>

A second optical anisotropic layer was prepared by the same method as that in the layer configuration a described above.

<Preparation of Liquid Crystal Display Device>

A liquid crystal display device was prepared by the same method as that in the layer configuration a described above.

(4) Preparation of Liquid Crystal Display Device of Layer Configuration d (Liquid Crystal Display Device of FIG. 4)

<Preparation of Rear-Side Polarization Plate>

<<Preparation of Polarization Plate Protective Film>>

A cellulose acylate film A was prepared by the same method as that in the layer configuration (h) described above.

<<Saponification of Cellulose Acylate Film>>

The prepared cellulose acylate film A was dipped in 4.5 mol/L of an aqueous solution of sodium hydroxide (a saponification solution) of which the temperature was adjusted to 37° C. for 1 minute, and then the film was washed with water, and after that, the film was dipped in 0.05 mol/L of an aqueous solution of a sulfuric acid for 30 seconds, and then passed through a water washing bath. Then, draining with an air knife was repeated three times, water dripping was performed, and then the film was dried by being retained in a drying zone at 70° C. for 15 seconds, and thus a film which was subjected to a saponification treatment was prepared.

<<Preparation of Polarizing Film>>

According to Example 1 of JP2001-141926A, a difference in a rotational speed was imparted to two pairs of nip rolls, and stretching was performed in a longitudinal direction, and thus a polarizing film having a width of 1330 mm and a thickness of 15 µm was prepared.

<<Bonding>>

The polarizing film obtained as described above was bonded to the film described above which was subjected to the saponification treatment by using an aqueous solution of polyvinyl alcohol of 3% (manufactured by Kurary Co., Ltd., polyvinyl alcohol-117H) as an adhesive agent in a roll-to-roll manner such that a polarization axis was orthogonal to the longitudinal direction of the cellulose acylate film, and thus a polarizing film having a protective film on one surface was prepared.

<<Formation of Alignment Film>>

A polyvinyl alcohol layer was formed on a side of the polarizing film to which the protective film was not bonded by the same method as that in the layer configuration a. The surface of the polyvinyl alcohol layer was continuously subjected to a rubbing treatment in a transport direction of the film.

<<Formation of Optical Anisotropic Layer>>

The following coating liquid for an optical anisotropic layer was applied onto the surface which was subjected to the rubbing treatment by using a bar coater. Next, the coating liquids were heated and matured at a film surface temperature of 60° C. for 60 seconds, and an alignment state thereof was fixed by being irradiated with an ultraviolet ray using an air cooling metal halide lamp (manufactured by Eye Graphics Co., Ltd.) of 20 mW/cm² in the air, and thus an optical anisotropic layer was prepared. In the prepared optical anisotropic layer, a rod-like liquid crystal compound was horizontally aligned such that a slow axis direction was parallel to the rubbing direction. At this time, the thickness of the optical anisotropic layer was 1.0 µm. Optical incident angle dependency of Re and a tilt angle of an optical axis were measured by using an automatic birefringence meter (KOBRA-21ADH, manufactured by Oji Scientific Instruments), and thus Re was 60 nm, Rth was 30 nm, and the tilt angle of the optical axis was 2° at a wavelength of 550 nm.

| Composition of Coating Liquid for Optical Anisotropic Layer | |
|---|---|
| Rod-Like Liquid Crystal Compound B01 | 90 parts by mass |
| Rod-Like Liquid Crystal Compound B02 | 10 parts by mass |
| Photopolymerization Initiator (Irgacure 907, manufactured by BASF SE) | 3.0 parts by mass |
| Sensitizer (Kayacure DETX, manufactured by Nippon Kayaku Co., Ltd.) | 1.0 parts by mass |
| Fluorine-Containing Compound Described below | 0.5 parts by mass |
| Methyl Ethyl Ketone | 400 parts by mass |

Fluorine-Containing Compound

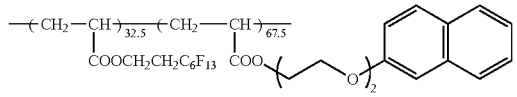

<Preparation of Liquid Crystal Display Device>

A liquid crystal display device was obtained by the same method as that in the layer configuration c except that a rear-side polarization plate was changed to the polarization plate prepared as described above.

<Evaluation>

Display performance was measured by using a commercially available liquid crystal view angle and chromaticity property measurement device Ezcom (manufactured by ELDIM S.A.), and a commercially available liquid crystal display device iPad (manufactured by Apple Inc.) was used as backlight.

<<Measurement of Depolarization Degree>>

An optical system of iPad such as a light source, a polarizing film, a phase difference film, an analyzer, and a light receiver (SR-ULIR, manufactured by Topcon Corporation) was constructed, and an absorption axis of the polarizing film and a slow axis of the phase difference film were arranged to be orthogonal to each other. In measurement of front depolarization degree, the polarizing film, the phase difference film, the analyzer, and the light receiver were arranged on a normal direction of the light source, the analyzer was rotated, and thus minimum luminance Lmin and maximum luminance Lmax were measured. In addition, in a blank state where the phase difference film was not placed, the analyzer was rotated, and thus minimum luminance $L_0$min and maximum luminance $L_0$max were measured. The depolarization degree was calculated by the following expression.

$$\text{Depolarization Degree} = L\text{min}/L\text{max} - L_0\text{min}/L_0\text{max}$$

Lmin indicates the minimum luminance of the phase difference film described above which was arranged between two polarization plates in a crossed nicol state.

Lmax indicates maximum luminance of the phase difference film described above which was arrange between two polarization plates in a parallel nicol state.

$L_0$min indicates the minimum luminance of the two polarization plate in the crossed nicol state.

$L_0$max indicates the maximum luminance of the two polarization plates in the parallel nicol state.

In measurement of the depolarization degree in an oblique direction, the polarizing film and the phase difference film were arranged on the normal direction of the light source, the analyzer and the light receiver were arranged in a line which was inclined by 50 degrees in an absorption axis direction of the polarizing film, and the analyzer was rotated, and thus minimum luminance and maximum luminance were measured. The depolarization degree in the oblique direction was calculated by using the same expression as that in the measurement of the front depolarization degree.

<Measurement of Order Parameter>

A dichromatic dye was added to a composition including the liquid crystal compound described above at a ratio of 1 mass % with respect to the liquid crystal compound.

As described above, a polyvinyl alcohol layer was prepared, and the surface of the polyvinyl alcohol layer was subjected to a rubbing treatment in a direction orthogonal to a longitudinal direction of the polyvinyl alcohol layer, and thus a polyvinyl alcohol alignment film was prepared. The composition to which the dichromatic dye described above was added was laminated on the surface of the obtained alignment film by a spin casting method (2500 rpm). The obtained layer was dried at a temperature shown in the table. The obtained film was subjected to the following measurement by using a spectroscopic absorption measurement device.

Each spectrum (absorbance) of a case where an alignment direction of the liquid crystal compound of the obtained film was set to be vertical and a case where the alignment direction of the liquid crystal compound of the obtained film was set to be horizontal was measured. Separately, a polarization absorption spectrum (absorbance) of quartz glass was measured. A value obtained by subtracting the polarization absorption spectrum of the quartz glass in the vertical direction from the polarization absorption spectrum of the liquid crystal compound in the vertical direction was defined as $A\perp$. A value obtained by subtracting the polarization absorption spectrum of the quartz glass in the horizontal direction from the polarization absorption spectrum of the liquid crystal compound in the horizontal direction was defined as $A_\parallel$.

The values were assigned to an expression of $OP=(A_\parallel-A\perp)/(2A\perp+A_\parallel)$, and thus the order parameter was calculated. The material or the manufacturing method of the optical anisotropic layer to which the dichromatic dye was added were approximately identical to those of the optical anisotropic layer prepared in the examples, and thus it was considered that the optical anisotropic layer prepared in the examples had an equivalent order parameter to the order parameter obtained by measuring optical anisotropy of the optical anisotropic layer to Which the dichromatic dye was added.

<<Evaluation of Front Contrast (CR)>>

Backlight was disposed in each IPS type liquid crystal display device prepared as described above, and luminance at the time of black display and at the time of white display was measured by using a measurement machine (EZ-Contrast XL88, manufactured by ELDIM S.A.), and thus a front contrast ratio (CR) was calculated and was evaluated on the basis of the following criteria. A practical level is greater than or equal to C.

A: $900 \leq CR$
B: $850 \leq CR < 900$
C: $800 \leq CR < 850$
D: $800 > CR$

<<Tint-hab σ>>

A variation in a tint angle hab at the time of plotting black tint changes (measured on 73 points in units of 5°) at a polar angle 60° on an a*b* plane was indicated by a standard deviation σ. It is indicated that a hue change increases as the value becomes greater, and evaluation was performed in the following three steps of A to C. A practical level is greater than or equal to B.

A: Less than or equal to 50
B: Greater than 50 and less than or equal to 70
C: Greater than 70

<Vertical Symmetry>

A hue angle hab at the time of plotting black tint at a polar angle of 60° on the a*b* plane at an azimuthal angle of 45° (an upper view angle) and −45° (a lower view angle) was evaluated by being compared with an absolute value of habσu of an upper field of view and habσs of a lower field of view. Furthermore, in a case of habσu>habσs and σh=habσs/habσuhabσu<habσs, it is indicated that hues in the upper field of view and in the lower field of view are identical to each other as the value of σh=habσu/habσs becomes 1, and evaluation was performed in the following three steps of A to C. A practical level is greater than or equal to B.

A: Greater than or equal to 0.5 and less than or equal to 1.0
B: Greater than or equal to 0.2 and less than 0.5
C: Greater than or equal to 0.1 and less than 0.2

<Total Evaluation>

The prepared film was mounted on iPad manufactured by Apple Inc., and unevenness in visual appearance, a tint change, and black luminance were evaluated in the black display.

A: Visual impression is extremely good, unevenness is not observed, and even when a view angle is rotated, the black display continues.

B: The visual impression is excellent, and the unevenness and the tint change are at a negligible level.

C: The visual impression is normal, and the unevenness and the tint change are not negligible, but are at a level where a product has no problem.

D: The unevenness and the tint change are significant, and are at a level where the product has a problem.

TABLE 8

| | First Optical Anisotropic Layer | | | | | | Second Optical Anisotropic Layer | | Film Thickness Difference Film | Depolarization Properties of Phase Difference Film | Display Properties | | | Total Evaluation |
|---|---|---|---|---|---|---|---|---|---|---|---|---|---|---|
| Layer Configuration | Liquid Crystal Compound | OP | Film Thickness | Re | Nz | ΔRe | OP | Film Thickness | Rth | | CR | Tint | Vertical | |
| Comparative Example 1 | Prepared by Same Method as That in Example 1 of JP2012-255926A | | | | | | | | | | D | C | B | D |
| Comparative Example 2 | Prepared by Same Method as That in Example 1 of JP2009-86260A | | | | | | | | | | D | C | B | D |

TABLE 8-continued

| | Layer Con-figuration | First Optical Anisotropic Layer | | | | | | Second Optical Anisotropic Layer | | | Film Thickness Difference Film | Depolarization Properties of Phase Difference Film | Display Properties | | | Total Eval-uation |
|---|---|---|---|---|---|---|---|---|---|---|---|---|---|---|---|---|
| | | Liquid Crystal Com-pound | OP | Film Thick-ness | Re | Nz | ΔRe | OP | Film Thick-ness | Rth | | | CR | Tint | Ver-tical | |
| Example 1 | a | α | 0.88 | 1.1 | 120 | 1 | Normal | 0.7 | 0.9 | −100 | 27.3 | 0.000010 | A | C | B | C |
| Comparative Example 3 | a | β | 0.7 | 1.4 | 120 | 1 | Normal | 0.7 | 0.9 | −100 | 27.6 | 0.000080 | D | C | B | D |
| Example 2 | a | γ | 0.78 | 1.3 | 120 | 1 | Normal | 0.7 | 0.9 | −100 | 27.5 | 0.000015 | B | C | B | C |
| Example 3 | a | α | 0.88 | 0.8 | 90 | 1 | Normal | 0.7 | 0.9 | −100 | 27.0 | 0.000010 | A | C | B | C |
| Example 4 | a | α | 0.88 | 1 | 110 | 1 | Normal | 0.7 | 0.9 | −100 | 27.2 | 0.000015 | B | C | B | C |
| Example 5 | a | α | 0.88 | 2.6 | 220 | 1 | Normal | 0.7 | 0.9 | −100 | 28.8 | 0.000024 | C | C | B | C |
| Comparative Example 4 | a | α | 0.88 | 3.1 | 300 | 1 | Normal | 0.7 | 0.9 | −100 | 29.3 | 0.000035 | D | B | B | D |
| Comparative Example 5 | a | α | 0.88 | 1.1 | 120 | 1 | Normal | 0.55 | 0.9 | −60 | 27.3 | 0.000028 | D | C | B | D |
| Comparative Example 6 | a | α | 0.88 | 1.1 | 120 | 1 | Normal | 0.7 | 0.2 | −30 | 26.6 | 0.000034 | D | C | B | D |
| Comparative Example 7 | a | α | 0.88 | 1.1 | 120 | 1 | Normal | 0.7 | 3.1 | −310 | 29.5 | 0.000033 | D | C | B | D |
| Example 6 | b | α | 0.88 | 1.1 | 120 | 1 | Normal | 0.7 | 0.9 | −100 | 2.3 | 0.000010 | A | B | B | B |
| Example 7 | b | ε | 0.86 | 1.2 | 118 | 1 | Reverse | 0.7 | 0.9 | −100 | 2.4 | 0.000010 | A | A | B | B |
| Example 8 | c | α | 0.88 | 1.1 | 120 | 1 | Normal | 0.7 | 0.9 | −100 | 2.3 | 0.000010 | A | B | B | B |
| Example 9 | d | α | 0.88 | 1.1 | 120 | 1 | Normal | 0.7 | 0.9 | −100 | 2.3 | 0.000010 | A | B | A | A |
| Example 10 | d | ε | 0.86 | 1.2 | 118 | 1 | Reverse | 0.7 | 0.9 | −100 | 2.4 | 0.000009 | A | A | A | A |
| Example 11 | c | α | 0.88 | 1.1 | 120 | 1 | Normal | 0.7 | 0.9 | −100 | 2.3 | 0.000010 | A | B | B | B |
| Example 12 | d | ε | 0.86 | 1.2 | 118 | 1 | Reverse | 0.7 | 0.9 | −100 | 2.4 | 0.000009 | A | A | A | A |

In Examples 1 to 12 described above, in the first optical anisotropic layer, the liquid crystal compound was fixed in the homogeneous alignment state and in the smectic phase state, and in the second optical anisotropic layer, the liquid crystal compound was fixed in the homeotropic alignment state and in the nematic phase. This was confirmed from the fact that homeotropic layer was quenched even at the time of rotating a sample in an environment of crossed nicol of a polarization microscope and Re was approximately 0 and Rth had negative birefringence properties in the optical measurement.

In Example 11, the vertical aligning agents S1 and S2 were not blended with the first optical anisotropic layer, and the compound was changed to the following fluorine-based compound in the same amount, and in Example 12, the vertical aligning agents S1 and S2 were not blended with the first optical anisotropic layer, and the following compound having a hydroxyl group in a lateral direction was blended with the first optical anisotropic layer in the same amount.

TABLE 9

Fluorine-Based Compound

[Chemical structure: a central aromatic ester compound with substituents $C_4F_9H_2CH_2COH_2CH_2CO$— groups on one benzene ring and $OCH_2CH_2OCH_2CH_2C_4F_9$ groups on another benzene ring, connected via ester linkages through a central phenyl group.]

Compound Having Hydroxyl Group in Lateral Direction

[Chemical structure: a terphenyl compound with $C_{10}H_{21}O$— and —$OC_{10}H_{21}$ terminal groups, with a lateral R substituent, where R = —O—CH₂CH₂—OH]

R

[Structure showing R = $-O-CH_2CH_2-OH$]

TABLE 9-continued

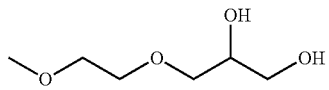

In the table described above, "OP" indicates an order parameter. The unit of the film thickness is μm. Re and Rth each indicate in-plane retardation and retardation in a thickness direction at a wavelength of 550 nm. Nz indicates (nx−nz)/(nx−ny), nx indicates a refractive index in a slow axis direction in a plane, ny indicates a refractive index in a direction orthogonal to nx in the plane, and nz indicates a refractive index in a direction orthogonal to nx and ny. In ΛRe, a case of "Normal" indicates a normal wavelength dispersion (Re(450)/Re(650)≥1), and a case of "Reverse" indicates a reverse wavelength dispersion (Re(450)/Re(650) <1).

Here, the order parameter of the first optical anisotropic layer of Comparative Example 1 was 0.72. As it is obvious from the table described above, as in Comparative Example 1, it was found that, even when the first optical anisotropic layer and the second optical anisotropic layer were laminated, the front contrast deteriorated when the order parameter of the first optical anisotropic layer was small, for example, 0.72.

It was found that, as in Comparative Example 2, when the first optical anisotropic layer and the second optical anisotropic layer were not adjacent to each other, as in Comparative Example 3, when the order parameter of the first optical anisotropic layer was less than 0.75, as in Comparative Example 4, when the film thickness of the first optical anisotropic layer was greater than 3.1 μm, as in Comparative Example 5, when the order parameter of the second optical anisotropic layer was less than 0.60, as in Comparative Example 6, when the film thickness of the second optical anisotropic layer was thinner than 0.3 μm, and as in Comparative Example 7, when the film thickness of the second optical anisotropic layer was thicker than 3.0 μm, the front contrast deteriorated.

In contrast, in all Examples 1 to 10, high front contrast, excellent tint, and excellent vertical symmetry were attained. Further, it was found that, as in Examples 7, 10, and 12, the first optical anisotropic layer had reverse wavelength dispersion properties, and thus higher front contrast was attained. In addition, as in Examples 9, 10, and 12, the polarization plate including the optical anisotropic layer in which the liquid crystal compound was tilt-aligned was used as the rear-side polarization plate, and thus an effect was obtained in which the tint and the vertical symmetry became more excellent.

<Preparation of Cellulose Acylate Film (F-1)>

<<Preparation of Cellulose Acylate Dope for Core Layer A>>

The following composition was put into a mixing tank and was stirred, and each component was dissolved, and thus a cellulose acetate solution was prepared.

| | |
|---|---|
| Cellulose Acetate Having Degree of Acetyl Substitution of 2.88 | 100 parts by mass |
| Ester Oligomer 2 | 13 parts by mass |
| Citric Acid Fatty Acid Monoglyceride (Poem K-37V, manufactured by Riken Vitamin Co., Ltd.) | 2 parts by mass |
| Methylene Chloride | 430 parts by mass |
| Methanol | 64 parts by mass |

Ester Oligomer 2

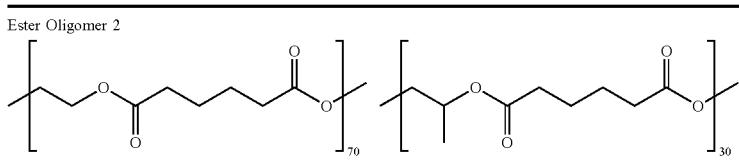

A numerical value represents a molar ratio of each unit, and a terminal is sealed with an acetyl group.
Molecular Weight 1000

<<Preparation of Cellulose Acylate Dope for Outer Layer A>>

10 parts by mass of the following matting agent solution was added to 90 parts by mass of the cellulose acylate dope for a core layer described above, and thus a cellulose acetate solution for an outer layer was prepared.

| | |
|---|---|
| Silica Particles Having Average Particle Size 16 nm (AEROSIL R972, manufactured by Nippon Aerosil Co., Ltd.) | 2 parts by mass |
| Methylene Chloride | 76 parts by mass |
| Methanol | 11 parts by mass |
| Cellulose Acylate Dope for Core Layer A | 1 part by mass |

<<Film Formation of F-1>>

The polymer solution described above was filtered through filter paper having an average pore diameter of 34 μm and a sintered metal filter having an average pore diameter of 10 μm, and then the cellulose acylate dope for a core layer A described above and the cellulose acylate dope for an outer layer A on both sides thereof were concurrently cast onto a drum at 20° C. in three layers from a casting port. The peeling off was performed in a state where a solvent content ratio was approximately 20 mass %, and both ends of the film in a width direction were fixed by using a tenter clip, and the film was dried while being stretched at a stretching ratio of 1.1 times in the horizontal direction. After that, the film was transported between rolls of a heat treatment device, and was further dried, and thus a phase difference film having a thickness of 25 μm was prepared, and this was set to a cellulose acylate film F-1.

<Preparation of Cellulose Acylate Films F-2 and F-3>
<<Preparation Cellulose Acylate Dope for Core Layer B>>

The following composition was put into a mixing tank and was stirred, and each component was dissolved, and thus a cellulose acetate solution was prepared.

| | |
|---|---|
| Cellulose Acetate Having Degree of Acetyl Substitution of 2.88 | 100 parts by mass |
| Ester Oligomer 3 | 15 parts by mass |
| Methylene Chloride | 333 parts by mass |
| Methanol | 63 parts by mass |
| Butanol | 3 parts by mass |

<<Preparation of Cellulose Acylate Dope for Core Layer C>>

The following composition was put into a mixing tank and was stirred, and each component was dissolved, and thus a cellulose acetate solution was prepared.

| | |
|---|---|
| Cellulose Acetate Having Degree of Acetyl Substitution of 2.88 | 100 parts by mass |
| Ester Oligomer 3 | 15 parts by mass |
| Citric Acid Fatty Acid Monoglyceride (Poem K-37V, manufactured by Riken Vitamin Co., Ltd.) | 3 parts by mass |
| Methylene Chloride | 331 parts by mass |
| Methanol | 62 parts by mass |
| Butanol | 3 parts by mass |

Ester Oligomer 3

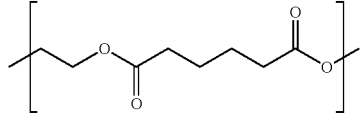

A terminal represents a hydroxyl group.
Molecular Weight 990

<<Preparation of Cellulose Acylate Dope for Outer Layer B>>

L3 parts by mass of the following matting agent solution was added to 100 parts by mass of the cellulose acylate dope for a core layer B described above, and thus a cellulose acetate solution for an outer layer was prepared.

| | |
|---|---|
| Silica Particles Having Average Particle Size of 16 nm (AEROSIL R972, manufactured by Nippon Aerosil Co., Ltd.) | 10 parts by mass |
| Methylene Chloride | 73 parts by mass |
| Methanol | 4 parts by mass |
| Butanol | 1 part by mass |
| Cellulose Acylate Dope for Core Layer B | 10 parts by mass |

<<Film Formation of F-2 and F-3>>

The polymer solution described above was filtered through filter paper having an average pore diameter of 34 μm and a sintered metal filter having an average pore diameter of 10 μm, and then the cellulose acylate dope for a core layer B described above and the cellulose acylate dope for an outer layer B on both sides thereof were concurrently cast onto a drum which was cooled to −5° C. in three layers from a casting port. The peeling off was performed in a state where a solvent content ratio was approximately 70 mass %, and both ends of the film in a width direction were fixed by using a pin tenter (a pin tenter disclosed in FIG. 3 of JP1992-1009A (JP-H04-1009A)), and the film was dried while being stretched at a stretching ratio of 1.05 times in the horizontal direction. After that, the film was transported between rolls of a heat treatment device, and was further dried, and thus a phase difference film having a thickness of 40 μm was prepared, and this was set to a cellulose acylate film F-2. In addition, the cellulose acylate dope for a core layer C described above and the cellulose acylate dope for an outer layer B on both sides thereof were combined, and film formation was concurrently performed, and thus a phase difference film having a thickness of 40 μm was prepared, and this was set to a cellulose acylate film F-3.

In Example 1, even when the cellulose acylate films F-1, F-2, and F-3 prepared instead of ZRF25 which is the supporter of the phase difference film were used, the evaluation point of the display performance and the total evaluation was not changed, but high front contrast, excellent tint, and excellent vertical symmetry were attained in all of the cellulose acylate films F-1, F-2, and F-3.

In addition, in Example 1, even when the cellulose acylate films F-1, F-2, and F-3 prepared instead of ZRF25 used in the reap-side polarization plate were used, the evaluation point of the display performance and the total evaluation was not changed, but high front contrast, excellent tint, and excellent vertical symmetry were attained in all of the cellulose acylate films F-1, F-2, and F-3.

EXPLANATION OF REFERENCES

1: polarizing film
2: protective film of polarizing film
3: phase difference film
4: first optical anisotropic layer
5: second optical anisotropic layer
6: supporter of phase difference film
7: alignment film
8: hard coat layer 9: liquid crystal cell
10: rear-side polarization plate
11: rear-side polarizing film
12: protective film of rear-side polarizing film
13: alignment film
14: optical anisotropic layer

What is claimed is:

1. A phase difference film, comprising:
a first optical anisotropic layer; and
a second optical anisotropic layer on a surface of the first optical anisotropic layer,
wherein the first optical anisotropic layer is formed by fixing a liquid crystal compound in a homogeneous alignment state, has an order parameter of 0.75 to 0.95, and has a layer thickness of 0.3 μm to 3.0 μm,
the second optical anisotropic layer is formed by fixing a liquid crystal compound in a homeotropic alignment state, has an order parameter of 0.60 to 0.95, and has a layer thickness of 0.3 μm to 3.0 μm,
the order parameter OP is denoted by $OP=(A_{\parallel}-A\perp)/(2A\perp+A_{\parallel})$, "$A_{\parallel}$" represents absorbance of the liquid crystal compound with respect to light polarized parallel to an alignment direction, and "$A\perp$" represents absorbance of the liquid crystal compound with respect to light polarized vertical to the alignment direction, and
the first optical anisotropic layer and the second optical anisotropic layer are in direct contact with each other; and.

2. The phase difference film according to claim 1,
wherein the first optical anisotropic layer is a layer formed by fixing the liquid crystal compound in a smectic phase state.

3. The phase difference film according to claim 1,
wherein the second optical anisotropic layer is a layer formed by fixing the liquid crystal compound in a nematic phase state.

4. The phase difference film according to claim 1,
wherein the first optical anisotropic layer satisfies Expressions (1) and (2) described below, $100 \text{ nm} \leq Re(550) \leq 200 \text{ nm}$  Expression (1)

$0.8 \leq Nz \leq 1.2$  Expression (2)

in Expression (1), Re(550) represents in-plane retardation at a wavelength of 550 nm, and
in Expression (2), Nz represents (nx−nz)/(nx−ny), nx represents a refractive index in a slow axis direction in a plane, ny represents a refractive index in a direction orthogonal to nx in the plane, and nz represents a refractive index in a direction orthogonal to nx and ny.

5. The phase difference film according to claim 1,
wherein the first optical anisotropic layer satisfies Expression (3) described below, $Re(450)/Re(650)<1$  Expression (3)

in Expression (3), Re(450) and Re(650) each represent in-plane retardation at a wavelength of 450 nm and 650 nm.

6. The phase difference film according to claim 1,
wherein the first optical anisotropic layer includes a leveling agent.

7. The phase difference film according to claim 6, wherein said leveling agent is one of a fluorine-based or a silicon-based leveling agent, and said leveling agent is in an amount of 0.01 mass % to 5 mass % with respect to the liquid crystal compound contained in the first optical anisotropic layer.

8. The phase difference film according to claim 1,
wherein the second optical anisotropic layer includes a vertical aligning agent.

9. The phase difference film according to claim 8, wherein said vertical aligning agent is one of a boronic acid or an onium salt in an amount of 0.1 mass % to 5 mass % with respect to the liquid crystal compound contained in the second optical anisotropic layer.

10. The phase difference film according to claim 1,
wherein a thickness of the phase difference film is 0.6 μm to 6 μm.

11. The phase difference film according to claim 1,
wherein each of the first optical anisotropic layer and the second optical anisotropic layer includes a rod-like liquid crystal compound.

12. The phase difference film according to claim 1,
wherein the phase difference film includes an alignment film, the first optical anisotropic layer, and the second optical anisotropic layer on a supporter in this order.

13. A polarization plate, comprising:
a polarizing film; and
the phase difference film according to claim 1.

14. The polarization plate according to claim 13,
wherein a first optical anisotropic layer is disposed on a surface of the polarizing film.

15. The phase difference film according to claim 1, wherein a depolarization degree is less than or equal to 0.000080.

16. A liquid crystal display device, comprising:
the phase difference film according to claim 1.

17. The liquid crystal display device according to claim 16,
wherein the liquid crystal display device is in an IPS mode.

18. The liquid crystal display device according to claim 16,
wherein the polarization plate according to claim 13 is disposed on a front side of the liquid crystal display device.

19. The liquid crystal display device according to claim 18,
wherein an optical film in which in-plane retardation Re(550) at a wavelength of 550 nm is 30 nm to 120 nm, and retardation Rth(550) in a thickness direction at a wavelength of 550 nm is 20 nm to 100 nm is disposed between a polarizing film on a rear side of the liquid crystal display device and a liquid crystal cell.

20. The liquid crystal display device according to claim 19,
wherein the optical film disposed on the rear side of the liquid crystal display device includes an optical anisotropic layer in which a liquid crystal compound is tilt-aligned.

* * * * *